United States Patent
Di Lorenzo et al.

(10) Patent No.: US 11,803,790 B2
(45) Date of Patent: Oct. 31, 2023

(54) SYSTEMS AND METHODS FOR UTILIZING MACHINE LEARNING MODELS TO DETERMINE SUGGESTED RIDE SHARING OF VEHICLES

(71) Applicant: Verizon Connect Development Limited, Dublin (IE)

(72) Inventors: David Di Lorenzo, Florence (IT); Gabriele Bianchi, Prato (IT); Stefano Caprasecca, Florence (IT); Francesco De Felice, L'Aquila (IT); Salvatore Impellizzieri, Milan (IT)

(73) Assignee: Verizon Connect Development Limited, Dublin (IE)

( * ) Notice: Subject to any disclaimer, the term of this patent is extended or adjusted under 35 U.S.C. 154(b) by 198 days.

(21) Appl. No.: 16/995,316

(22) Filed: Aug. 17, 2020

(65) Prior Publication Data

US 2021/0334722 A1 Oct. 28, 2021

(30) Foreign Application Priority Data

Apr. 27, 2020 (IT) .................. 102020000009031

(51) Int. Cl.
*G06Q 10/0631* (2023.01)
*G06Q 50/30* (2012.01)
(Continued)

(52) U.S. Cl.
CPC ....... *G06Q 10/06313* (2013.01); *G06N 20/00* (2019.01); *G06Q 10/047* (2013.01);
(Continued)

(58) Field of Classification Search
None
See application file for complete search history.

(56) References Cited

U.S. PATENT DOCUMENTS

2011/0137691 A1* 6/2011 Johnson ................. G06Q 10/04
 715/764
2016/0247094 A1* 8/2016 Scicluna ................ G06Q 50/30
(Continued)

OTHER PUBLICATIONS

Xie, X. (2017). Fleet-oriented real-time vehicular tracking at uroan scale (Order No. 10752989). Available from ProQuest Dissertations and Theses Professional. (2003275325). Retrieved from https://dialog.proquest.com/professional/docview/2003275325?accountid=131444. (Year: 2017).*

*Primary Examiner* — Stephanie Z Delich

(57) ABSTRACT

A device may generate a shortest path tree based on a passenger starting point identified in driving data. The device may generate a graph with a first layer and a second layer that correspond to the shortest path tree and may add paths from nodes in the first layer to corresponding nodes in the second layer. The device may identify a first shortest path that starts from a driver starting node in the first layer and ends at a passenger end node in the second layer and a second shortest path that starts from the passenger end node and ends at a driver end node in the second layer. The device may calculate a shared cost associated with the driver and the passenger sharing a ride based on the first shortest path and the second shortest path. The device may generate a recommendation based on the shared cost.

20 Claims, 21 Drawing Sheets

(51) Int. Cl.
    *G06N 20/00*           (2019.01)
    *G06Q 10/047*         (2023.01)
    *G07C 5/08*            (2006.01)

(52) U.S. Cl.
    CPC ......... *G06Q 10/0631* (2013.01); *G06Q 50/30* (2013.01); *G07C 5/0841* (2013.01)

(56) References Cited

U.S. PATENT DOCUMENTS

| | | | |
|---|---|---|---|
| 2017/0167882 A1* | 6/2017 | Ulloa Paredes | G01C 21/3438 |
| 2017/0254656 A1* | 9/2017 | Bhogal | G06Q 50/14 |
| 2017/0270447 A1* | 9/2017 | Borean | H04W 4/023 |
| 2019/0066250 A1* | 2/2019 | Levy | G01C 21/3626 |
| 2019/0324458 A1* | 10/2019 | Sadeghi | G06F 8/65 |
| 2019/0354903 A1* | 11/2019 | Seki | G06Q 30/0284 |
| 2020/0011681 A1* | 1/2020 | Kang | G01C 21/3438 |

\* cited by examiner

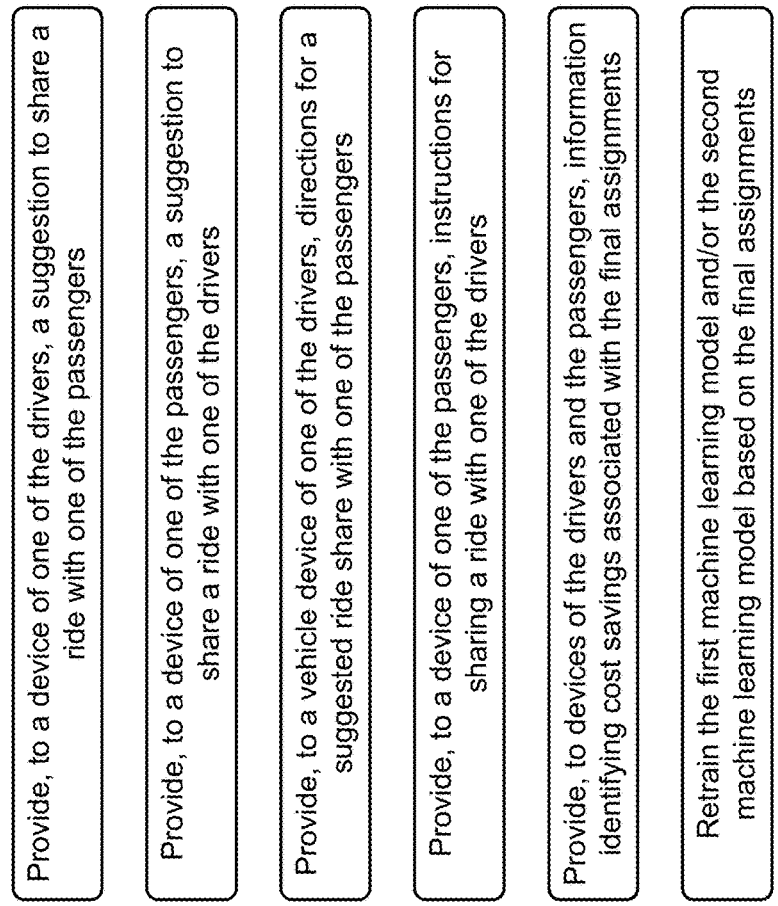
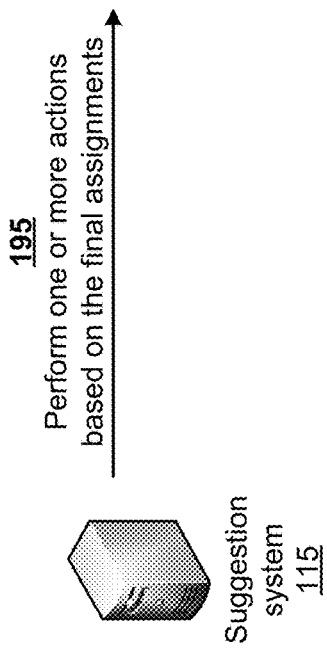
FIG. 1P

SYSTEMS AND METHODS FOR UTILIZING MACHINE LEARNING MODELS TO DETERMINE SUGGESTED RIDE SHARING OF VEHICLES

CROSS-REFERENCE TO RELATED APPLICATION

This application claims priority to Italian Application No. 102020000009031, filed on Apr. 27, 2020, entitled "SYSTEMS AND METHODS FOR UTILIZING MACHINE LEARNING MODELS TO DETERMINE SUGGESTED RIDE SHARING OF VEHICLES," which is hereby expressly incorporated by reference herein.

BACKGROUND

A ride sharing or carpool service may match passengers with drivers and/or vehicles via websites and/or mobile applications.

DETAILED DESCRIPTION OF PREFERRED EMBODIMENTS

Figure 1A:
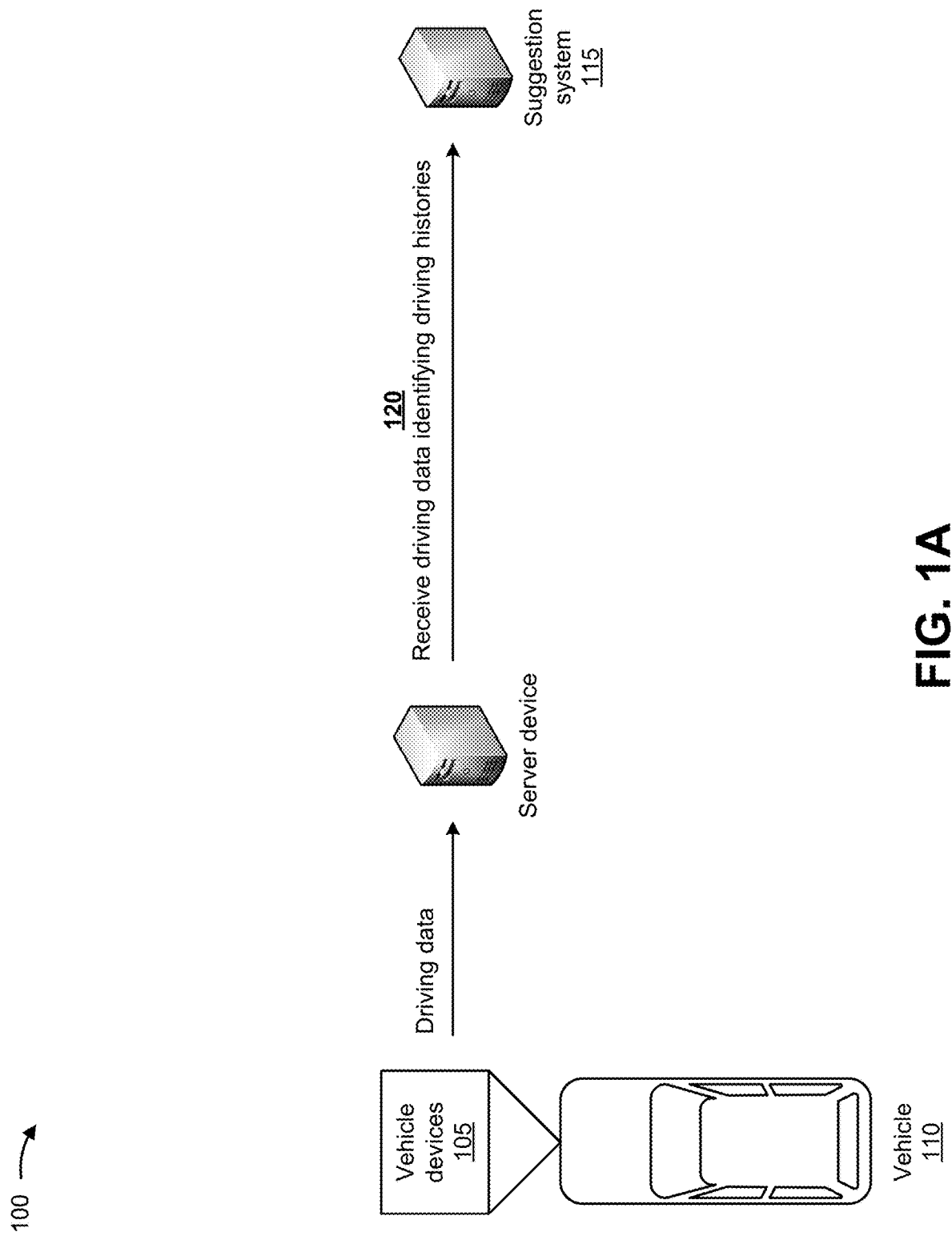
FIGS. 1A-1P are diagrams of an example implementation described herein.

The following detailed description of example implementations refers to the accompanying drawings. The same reference numbers in different drawings may identify the same or similar elements.

A carpooling or ride sharing service provides certain mechanisms (e.g., websites, mobile applications, and/or the like) to enable multiple people to share a trip in a single vehicle rather than each person using their own vehicle to make the trip. For example, when registering for a carpooling service, a user typically creates a profile and is asked to respond to a questionnaire for providing trip information to the carpooling service (e.g., a starting location, a destination, a departure time, and/or the like). The carpooling service may use a matching algorithm to provide the user with a list of other users having one or more items of trip information that match one or more items of trip information input by the user (e.g., potential matches).

The user may then be required to actively search through the list of potential matches and attempt to find someone that the user may carpool with. When a potential match is found, the user may utilize the carpooling service to exchange messages with the potential match to attempt to agree on various aspects of their trip, such as a meeting place, which person will drive, and/or the like (via a direct messaging service that carpooling services often provide). The user may determine that it is more efficient not to carpool with the potential match rather than traveling to pick up the potential match at that person's home or a common meeting place. If an agreement with respect to these aspects of their trip cannot be reached, the user must repeat the process until a successful match is found.

The above-mentioned drawbacks and limitations associated with carpooling services may lead to inefficiency and substantial wasted time (e.g., time spent by a user providing trip information to the carpooling service, actively searching through the list of potential matches, exchanging messages with a potential match to attempt to agree on various aspects of their trip, and/or the like) and computing resources (e.g., processor resources, memory resources, communication resources, and/or the like). For example, in order to identify potential matches based on responses to a questionnaire, substantial computing resources may be consumed by, for example, a user accessing the online carpooling service, presenting questions to the user, receiving and processing responses to the questions, inputting the responses to the matching algorithm, and/or the like. Furthermore, when users are presented with matches that do not result in reaching an agreement with respect to carpooling, additional computing resources are consumed each time that the matching algorithm is executed to find new matches, the carpooling service communicates the matches to the user, the carpooling service facilitates communications between the potential matches (via a direct messaging service that carpooling services often provide), and/or the like. When matching algorithms depend on self-reported trip information, preferences, and/or the like, a probability that one or more matches will not succeed may increase because the information input by the user may not accurately reflect the user's actual trip information. For example, a user may begin to leave for work (e.g., put on a jacket, get the car keys, and/or the like) every morning at 8:00 am, but may actually leave for work at 8:20 am. The user may thus input a start time for their morning trip to work as 8:00 which may result in the matching algorithm receiving inaccurate input data, thereby wasting computing resources.

According to some implementations described herein, a suggestion system may obtain driving information associated with trips made by users over a period of time (e.g., a day, a week, a month, a year, and/or the like). The suggestion system may analyze the driving information to identify recurrent trips, such as a person traveling from home to work around the same time every weekday, a delivery route traveled by a delivery truck every Monday morning, a route traveled by a school bus every school day, and/or the like.

The suggestion system may utilize a machine learning model to identify sets of recurrent trips that could be combined or shared. For example, the suggestion system may identify sets of recurrent trips that have similar starting locations, starting times, and destinations (e.g., a group of people who live in the same neighborhood and travel along similar routes to work at about the same time every day); sets of recurrent trips associated with routes that at least partially overlap (e.g., a person travels past a home and a place of work of another person at about the same time the other person is traveling to work); sets of recurrent trips associated with routes that connect (e.g., an end of a first delivery route traveled by a first delivery truck is close to a start of a second delivery route traveled by a second delivery truck), sets of trips that could be facilitated by public transportation (e.g., a bus, a metro line, a sub-way line, and/or the like) and/or the like.

The suggestion system may calculate a shared cost associated with combining or sharing a set of recurrent trips and an unshared cost associated with each recurrent trip being made separately. The suggestion system may generate a recommendation for users associated with the recurrent trips to share or not share the ride based on a comparison of the shared cost and the unshared cost.

By utilizing driving information obtained from vehicle devices, the suggestion system ensures that accurate trip information is input into an algorithm used to determine potential ride sharing matches thereby conserving computing resources relative to systems that utilize user provided trip information. The suggestion system ensures that a cost associated with the shared trip (e.g., a distance traveled, a travel time, and/or the like) is less than a cost associated with each user utilizing their own vehicle to reach their respective destinations. In this way, the suggestion system increases a likelihood that potential matches will ride share thereby conserving computing resources that otherwise would be utilized by a user performing multiple searches for potential ride sharing matches. Further, increasing the likelihood that potential matches will ride share may reduce the number of vehicles needed for transport on the road, thereby reducing fuel consumption and carbon dioxide emissions.

FIGS. 1A-1P are diagrams of an example implementation 100 described herein. As shown in FIGS. 1A-1P, example implementation 100 includes vehicle devices 105, a vehicle 110, and a suggestion system 115.

The vehicle 110 may include one or more vehicle devices 105 for collecting driving data as the vehicle 110 travels along a route. For example, the vehicle devices 105 may include an inertial measurement unit (IMU), a three-axis accelerometer, a global positioning system (GPS) device, and/or the like. In some implementations, one or more of the vehicle devices 105 may be included in a mobile device associated with a user (e.g., a driver, a passenger, and/or the like) of the vehicle 110.

The vehicle devices 105 may provide the driving data to the suggestion system 115. In some implementations, the vehicle devices 105 provide the driving data to the suggestion system 115 via another device. For example, as shown in FIG. 1A, the vehicle devices 105 may provide the driving data to a server device associated with the suggestion system 115. The server device may receive driving data from vehicle devices of a plurality of vehicles and may store the driving data in a data structure (e.g., a data base, a list, and/or the like).

In some implementations, the vehicle devices 105 provide the driving data to the suggestion system 115 and/or the server device in real-time and/or as the vehicle 110 travels along a route associated with the driving data. Alternatively, and/or additionally, the vehicle devices 105 provide the driving data to the suggestion system 115 and/or the server device based on an occurrence of an event such as receiving an input from a user, being connected to a particular network (e.g., a WiFi network, a home network of the user, and/or the like), the vehicle 110 reaching a destination (e.g., a home of the user, a place of work of the user, and/or the like), determining that the vehicle 110 is parked, determining that the vehicle 110 is stopped, determining that a trip has ended (e.g., that the vehicle 110 has reached a particular destination), determining that a new trip is beginning, and/or the like. The above-listed events are intended to be merely examples of types of events that may be used. In practice, the events may include any one or more of the above-listed events and/or one or more other types of events not listed above.

As shown in FIG. 1A, and by reference number 120, the suggestion system 115 receives driving data identifying driving histories. The suggestion system 115 may receive the data directly from the vehicle devices 105, other vehicle devices associated with other vehicles, and/or from the server device. The driving data may identify driving histories associated with the vehicle 110. Each driving history may include information identifying the vehicle 110, information identifying a user or users associated with the vehicle 110, information identifying one or more vehicle devices 105 associated with the vehicle 110, trip driving data obtained by one or more vehicle devices 105 on-board the vehicle 110 for a particular trip taken by a user associated with the vehicle 110 (e.g., the user utilizing the vehicle 110 to travel from home to work on a particular day), and/or the like. The trip driving data may include information identifying a starting location, an ending location, a starting time, an ending time, a day of the week, and/or the like associated with the trip. The suggestion system 115 may associate the driving data with the information identifying each user of the vehicle, the information identifying the vehicle 110, and/or the information identifying the vehicle device 105 in a data structure based on receiving the driving data.

The suggestion system 115 may obtain the driving data over a period of time (e.g., a day, a week, a month, a year, and/or the like). In some implementations, the suggestion system 115 may obtain the driving data based on a request. For example, the suggestion system 115 may periodically transmit a request for driving data obtained over the period of time from a vehicle device 105. The vehicle device 105 may transmit the driving data obtained over the period of time to the suggestion system 115 based on the request.

Alternatively, and/or additionally, the vehicle device 105 may transmit the driving data to the suggestion system 115 based on the occurrence of an event. For example, the vehicle device 105 may transmit the driving data to the suggestion system 115 based on determining an expiration of a timer (e.g., a timer set to cause the vehicle device 105 to transmit the driving data to the suggestion system 115 at a particular time every day, every week, every month, and/or the like), based on determining that the vehicle 110 has been shifted into park, based on the vehicle device 105 connecting to a particular network and/or a particular type of network (e.g., a WiFi network, a home network associated with the user, and/or the like), and/or the like.

In some implementations, the vehicle device 105 may transmit the driving data to the suggestion system 115 via a wireless network such as a WiFi network, a cellular network, and/or the like.

Figure 1B:
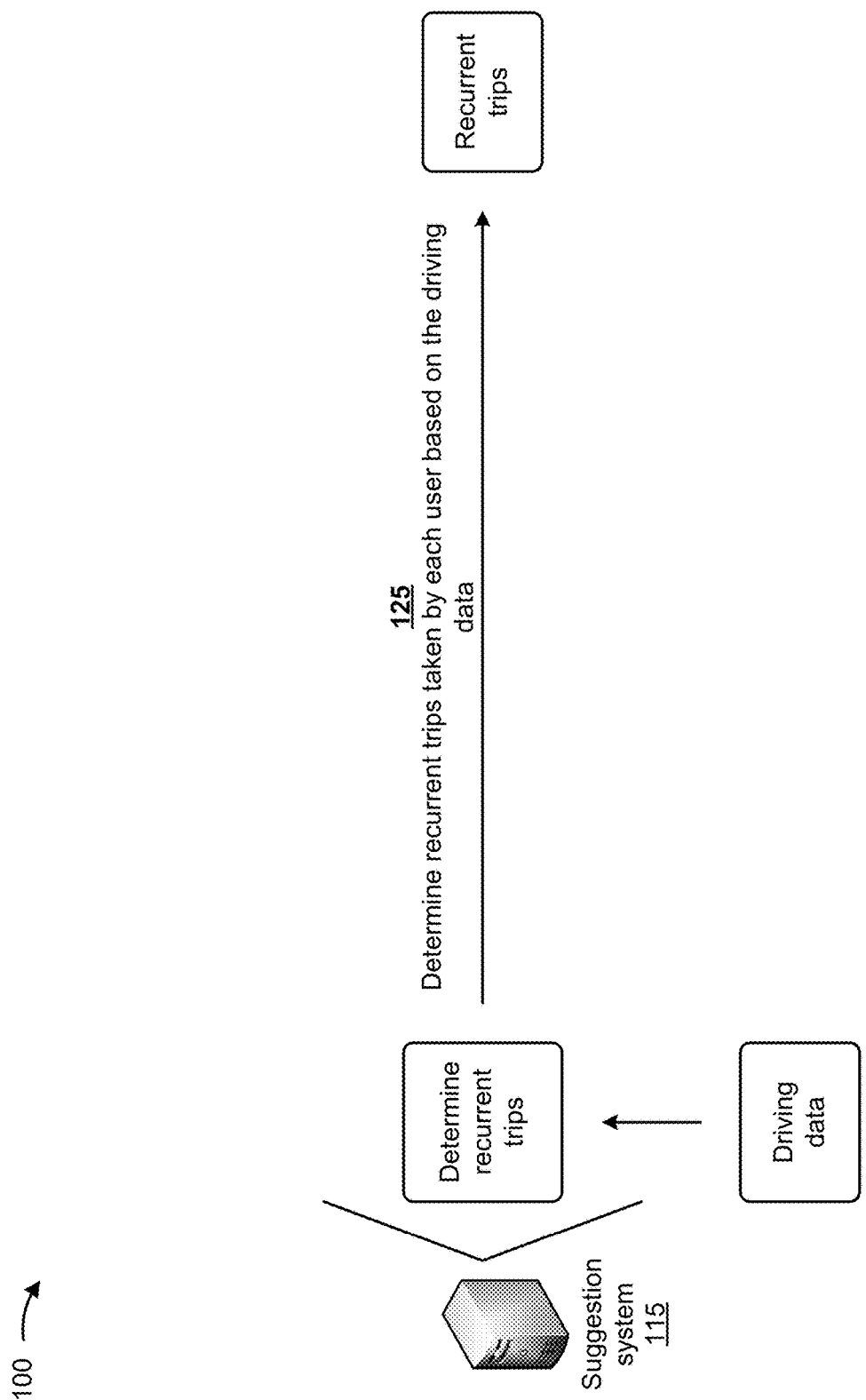

As shown in FIG. 1B, and by reference number 125, the suggestion system 115 may determine a recurrent trip taken by the vehicle 110 (e.g., by a driver of vehicle 110) based on the driving histories. For example, the suggestion system 115 may access a data structure storing information associating the driving data with the information identifying the user, the information identifying the vehicle 110, and/or the information identifying the vehicle device 105 in a data structure based on receiving the driving data to obtain driving histories associated with the vehicle 110, the vehicle device 105, and/or the user associated with the vehicle 110. The suggestion system 115 may identify plurality of trips associated with the vehicle 110 and/or a user associated with the vehicle 110 based on the driving histories. The suggestion system 115 may boxify or classify one or more characteristics associated with the plurality of trips (e.g., a day of the week associated with each trip, a starting time associated with each trip, an ending time associated with each trip, a starting location associated with each trip, and ending location associated with each trip, and/or the like).

For example, the suggestion system 115 may determine a range of possible values for a characteristic and may divide the range of possible values into sub-ranges of possible values or boxes. For example, a characteristic may be a time of day at which a trip began. The suggestion system 115 may determine the range of possible values for the time of day as including 12:00 am, 12:01 am; 12:02 am, . . . 11:59 pm. The suggestion system 115 may divide the range of possible values into 30 minute intervals. Each 30 minute interval may correspond to a box. The suggestion system 115 may boxify a trip having a starting time of 8:15 am by associating the trip with a box corresponding to a time interval starting at 8:00 am and ending at 8:30 am.

The suggestion system 115 may determine a plurality of day boxes. Each day box may be associated with a day of the week (e.g., Monday, Tuesday, Wednesday, and the like). The suggestion system 115 may associate each trip with a day box based on a day of the week that the trip was taken. For example, a first day box may be associated with Monday. The suggestion system 115 may associate each trip that was taken on a Monday with the first day box.

The suggestion system 115 may determine a plurality of time boxes. The suggestion system 115 may partition a day (e.g., a twenty-four hour period) into a plurality of time intervals (e.g., 15 minutes, 30 minutes, 1 hour, and/or the like). The suggestion system 115 may associated each time box with a time interval. For example, the suggestion system 115 may partition a day into thirty minute time intervals. A first time box is associated with a time interval that starts at 12:00 am and ends at 12:30 am, a second time box is associated with a time interval that starts at 12:30 am and ends at 1:00 am, and the like. For each trip, the suggestion system 115 may determine a time box associated with a time interval that includes the starting time of the trip (e.g., a starting time box) and a time box associated with a time interval that includes the ending time of the trip (e.g., an ending time box).

For example, assume a trip has a starting time of 8:05 am, and ending time of 9:05 am. The suggestion system 115 may associate the starting time with a starting time box associated with a time interval starting at 8:00 am and ending at 8:30 am and may associate the ending time with an ending time box associated with a time interval starting at 9:00 am and ending at 9:30 am.

The suggestion system 115 may determine a geographic area associated with the plurality of trips (e.g., a city, a county, a state, a geometric shape centered on a location of a home of a user, and/or the like). The suggestion system 115 may divide the geographic area into a plurality of location boxes. For example, the suggestion system 115 may divide the geographic area in to a plurality of square boxes (e.g., a plurality of 0.5 mile×0.5 mile square boxes, a plurality of 1.0 mile×1.0 mile square boxes, a plurality of 0.5×1.0 rectangular boxes, and/or the like). For each trip, the suggestion system 115 may determine a location box associated with a geographic area that includes the starting location (e.g., a starting location box) and a location box associated with a geographic area that includes the ending location (e.g., an ending location box).

The suggestion system 115 may identify a group of trips associated with the same day box, the same starting time box, the same ending time box, the same starting location box, and the same ending location box. The suggestion system 115 may determine that a quantity of trips, included in the group of trips, is greater than a threshold quantity of trips.

In some implementations, the threshold quantity of trips may be determined based on a period of time associated with the driving data and the threshold quantity of trips may be determined based on a quantity of weeks occurring during the period of time (e.g., the threshold quantity of trips may be eight for a ten week period of time). The suggestion system 115 may determine that the group of trips are a recurrent trip based on the quantity of trips being greater than the threshold quantity of trips.

Alternatively, and/or additionally, the suggestion system 115 determines a recurrent trip based on information input by a user. For example, a user may input information identifying a recurrent trip (e.g., a starting location, an ending location, a starting time, an ending time, a day of the week, and/or the like) via a user interface associated with the suggestion system 115.

The suggestion system 115 may determine a potential match for ride sharing (e.g., another user) based on the recurrent trip. In some implementations, the suggestion system 115 may determine the potential match by randomly selecting another user from a plurality of other users associated with the driving data.

In some implementations, the suggestion system 115 may determine the potential match based on the recurring trip determined for the user. For example, the suggestion system 115 may identify other recurrent trips taken by the plurality of other users based on the driving data, in a manner similar to that described above. The suggestion system 115 may identify a group of other recurrent trips that are associated with one or more of the same day box, the same starting time box, the same ending time box, the same starting location box, or the same ending location box associated with the recurrent trip. The suggestion system 115 may determine the potential match from a group of other users associated with the group of other recurrent trips. For example, the suggestion system 115 may determine the potential match by randomly selecting a user from the group of other users, by determining a user associated with another recurrent trip that has a starting location that is closest to the starting location of the recurrent trip, that has a starting time closest to the starting time of the recurrent trip, and/or the like.

The suggestion system 115 may determine that the user is a passenger and that the potential match is a driver. In some implementations, the suggestion system 115 may determine that the user is the passenger (and/or that the potential match is the driver) based on information included in a user profile. In some implementations, the suggestion system 115 may randomly determine that the user is the passenger and that the potential match is the driver.

In some implementations, the suggestion system 115 may utilize a first machine learning model to determine whether user and the potential match should share a ride. For example, the suggestion system 115 may train the first machine learning model based on one or more parameters associated with the user and the potential match sharing a ride, such as information associated with the recurrent trip, information associated with the other recurrent trips, a cost associated with the user and the potential match sharing a ride, a cost associated with the user and the potential match traveling separately, and/or the like. The suggestion system 115 may train the first machine learning model, according to the one or more parameters, using historical data associated with the user and the potential match sharing a ride. Using the historical data and the one or more parameters as inputs to the first machine learning model, the suggestion system 115 may compute a cost associated with the user and the potential match sharing a ride and a cost associated with the user and the potential match traveling separately to determine whether the user and the potential match should share a ride, as described below.

Figure 1C:
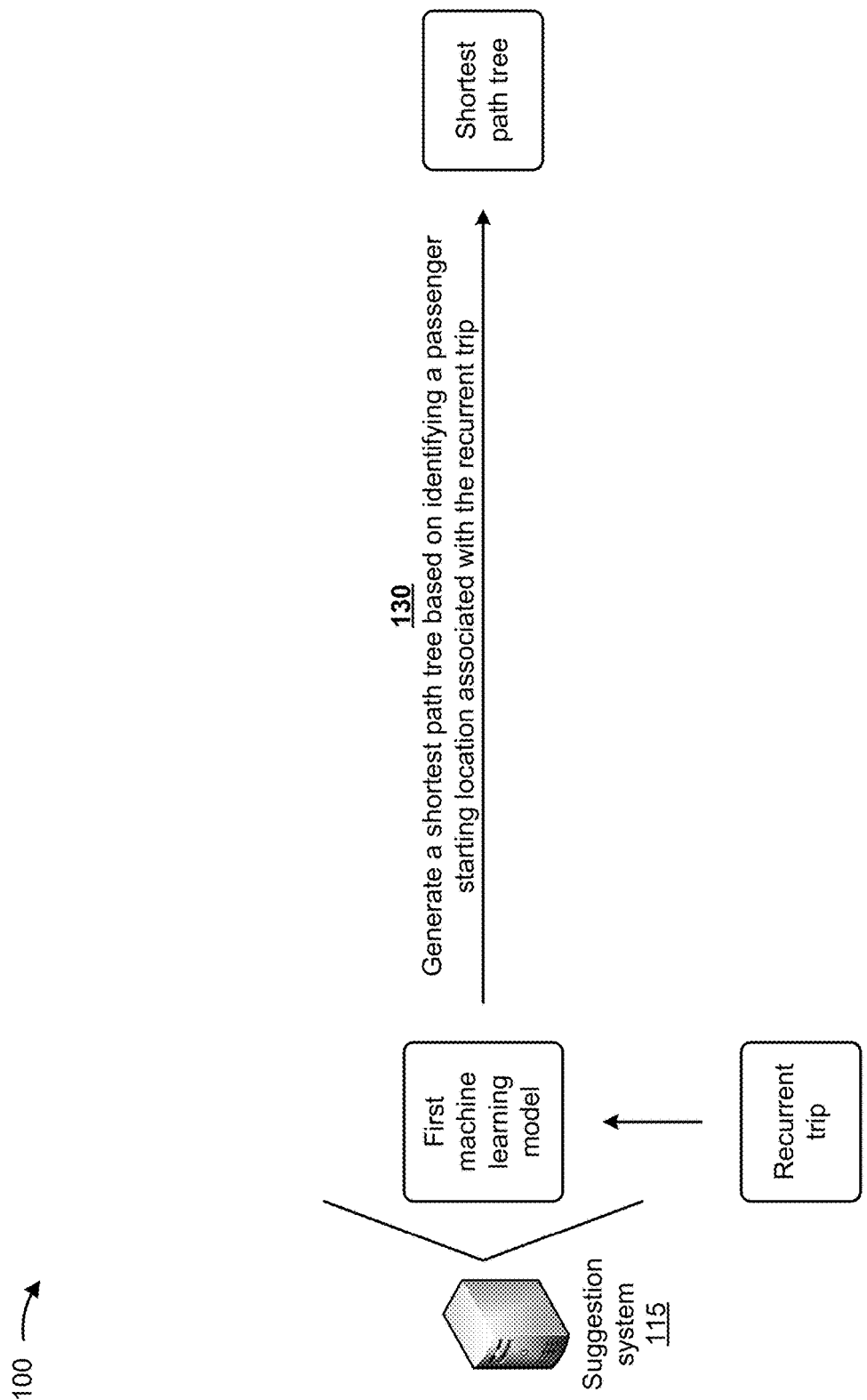

As shown in FIG. 1C, and by reference number 130, the suggestion system 115 utilizes the first machine learning model to generate a shortest path tree based on identifying a starting location associated with the recurrent trip. For example, the suggestion system 115 obtains street and/or map data of a geographic area associated with the driving data. The suggestion system 115 generates a first graph of nodes interconnected by one or more edges based on the map data. Each node represents an intersection of two roads. Each edge represents a portion of road connecting two intersections. A weight of each edge corresponds to a distance of the portion of the road represented by each edge.

The suggestion system 115 uses an algorithm (e.g., a Dijkstra algorithm, an A* algorithm, and/or the like) to compute the shortest path tree from a node representing the starting location of the recurrent trip to the rest of the first graph. The shortest path may be computed in terms of time and/or distance. In some implementations, the algorithm may be modified, such as with bounding boxes, contraction hierarchies, early termination, heuristics to limit a size of the graph, and/or the like.

Figure 1D:
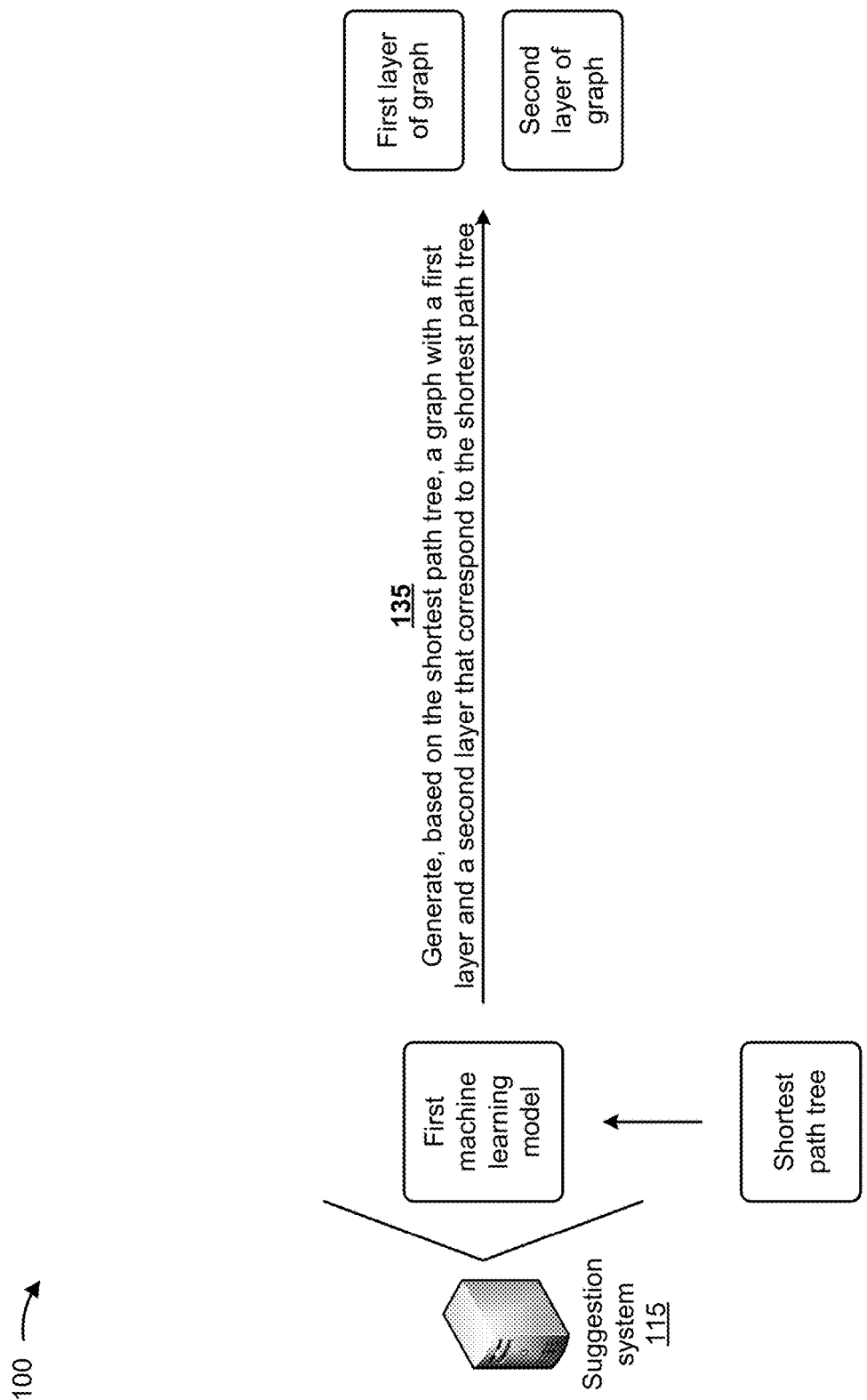

As shown in FIG. 1D, and by reference number 135, the suggestion system 115 utilizes the first machine learning model to generate a second graph based on the shortest path tree. The second graph may include two nodes for every node in the first graph. For example, the first graph may include nodes A, B, and C. The second graph may include nodes A, A, B, B, C, and C. The suggestion system 115 may organize the nodes of the second graph into two layers. Each layer may correspond to the first graph (e.g., each layer may include nodes A, B, and C connected by edges in a same manner as the nodes are connected in the first graph).

In some implementations, the second graph may include more than two layers. Each layer may correspond to the first graph, as described above. The quantity of layers included in the second graph may correspond to a quantity of users for which the suggestion system 115 is determining whether to share a ride (e.g., a determination of whether two users should share a ride would utilize a graph that includes two layers, a determining of whether three users should share a ride would utilize a graph that includes three layers, and/or the like).

Figure 1E:
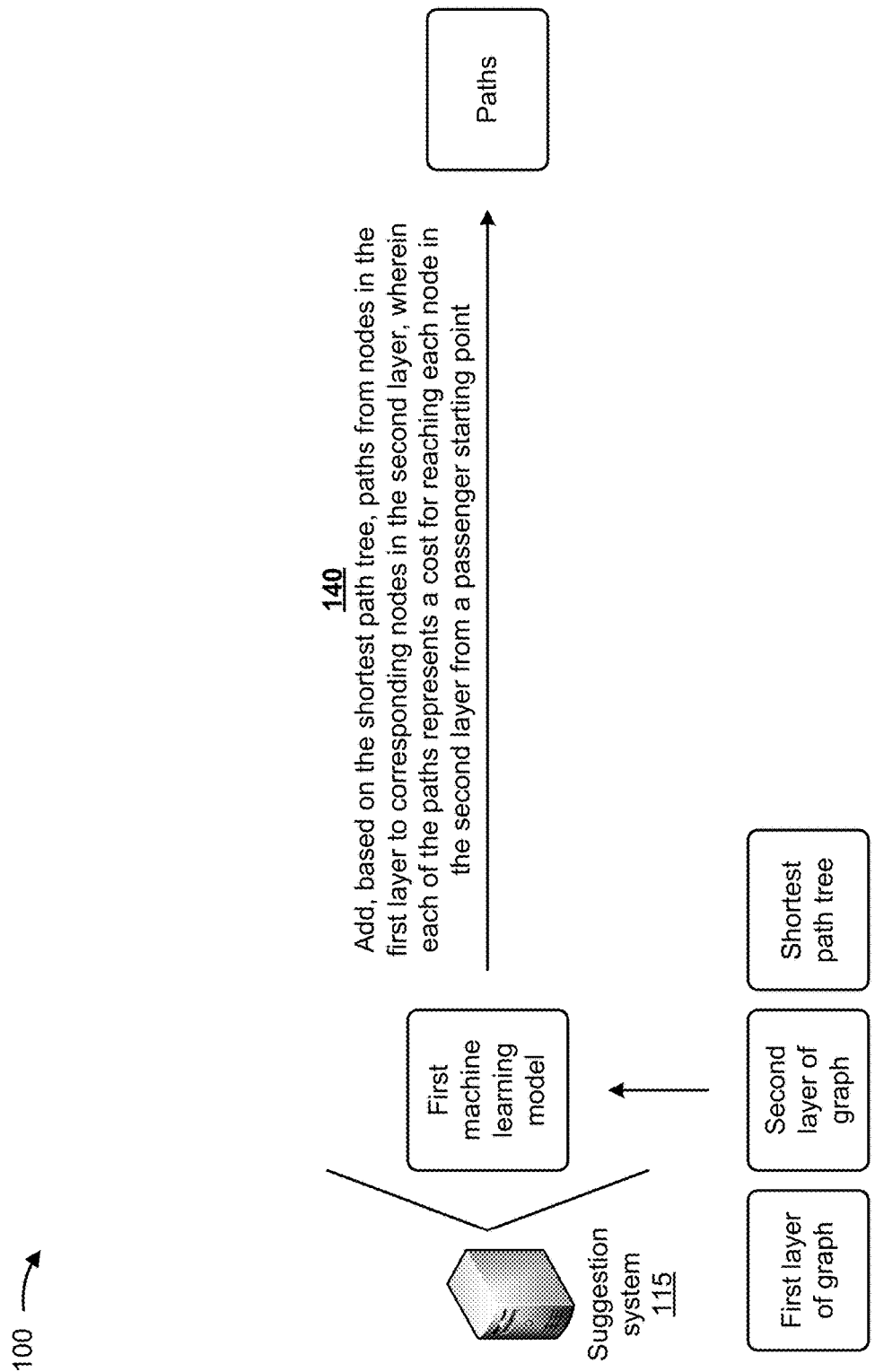

As shown in FIG. 1E, and by reference number 140, the suggestion system 115 utilizes the first machine learning model to add arcs or paths from nodes in the first layer to corresponding nodes in the second layer to the graph (e.g., an arc from node A in the first layer to node A in the second layer, an arc from node B in the first layer to node B in the second layer, and/or the like). Each of the paths may represent a cost for reaching each node in the second layer from the starting location of the recurrent trip (e.g., a starting location of the passenger). For example, a distance between a node corresponding to the starting location in the first layer and another node may be ten miles based on the shortest path tree. The path from the other node in the first layer to the other node in the second layer may represent a cost of ten miles based on the user having to travel ten miles to reach the other node from the starting location.

Utilizing the multiple layers may enable the suggestion system 115 to optimize a cost associated with each passenger sharing a ride. For example, by computing the shortest path tree based on starting from a node in the first layer that corresponds to a starting location of the driver and ending at a node in the second layer corresponding to an ending location of the passenger, a shortest path algorithm used to compute the shortest path tree may choose a single path connecting the first layer to the second layer. Because each path represents a cost for reaching that node from a starting location of the passenger, the shortest path algorithm determines a route corresponding to the best compromise between a cost to the driver and a cost to the passenger.

Figure 1F:
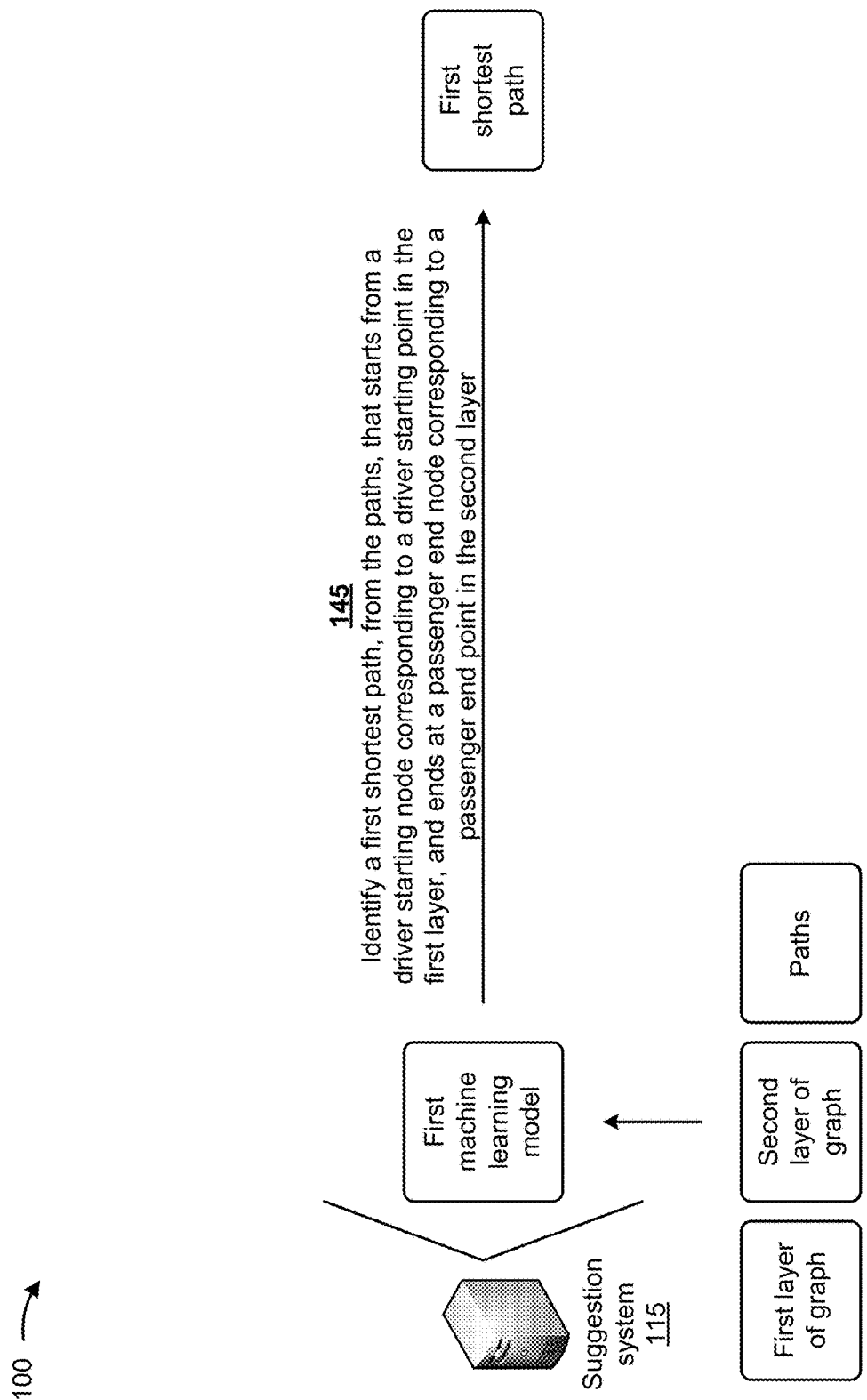

As shown in FIG. 1F, and by reference number 145, the suggestion system 115 utilizes the first machine learning model to identify a first shortest path on the second layer, starting from a driver starting node corresponding to a starting location of the other recurrent trip (e.g., a starting location of the driver (e.g., the potential match)) on the first layer and ending at a passenger ending node in the second layer corresponding to the ending location of the recurrent trip (e.g., the ending location of the passenger (e.g., the user)). The suggestion system 115 may determine the first shortest path based on a single path connecting the first layer and the second layer. Because each path represents a cost for reaching each node in the second layer from the starting location of the recurrent trip (e.g., a starting location of the passenger), the suggestion system 115 may optimize a total cost associated with a ride sharing arrangement between the user and the potential match by determining the first shortest path based on the single path connecting the first layer and the second layer.

Figure 1G:
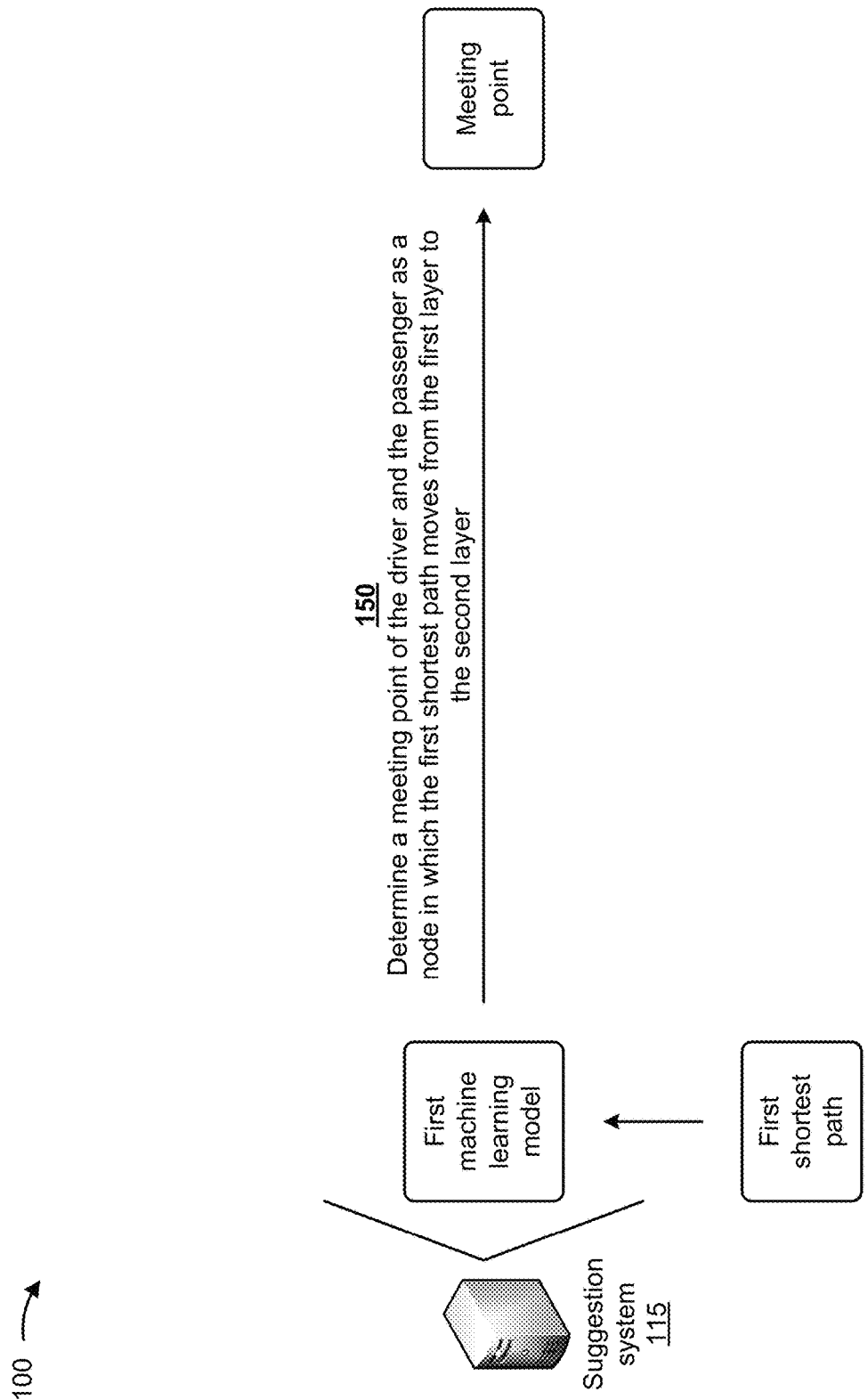

As shown in FIG. 1G, and by reference number 150, the suggestion system 115 utilizes the first machine learning model to determine a meeting point of the driver and the passenger as a node in which the first shortest path moves from the first layer to the second layer. In some implementations the node corresponding to the meeting point of the driver and the passenger may be the node corresponding to the starting location of the recurrent trip (e.g., the starting location of the passenger). In some implementations, the node corresponding to the meeting point of the driver and the passenger may be a node that does not correspond to the starting location of the recurrent trip. In these implementations, the passenger may be required to travel (e.g., using vehicle 110) to the meeting point.

In some implementations, the passenger and/or the driver indicates a preference associated with the meeting point. The suggestion system 115 may modify the graph by removing one or more paths, modifying a weight associated with one or more paths, and/or the like based on the preference. The suggestion system 115 may compute the first shortest path based on the modified graph. The first shortest path may correspond to a shortest path in terms of distance and/or time For example, the passenger may indicate that the meeting point is to be associated with a parking lot at which the passenger may park the vehicle 110. The suggestion system 115 may modify the graph by removing paths connecting corresponding nodes that are not associated with a parking lot. The suggestion system 115 may compute the first shortest path based on the modified graph. By removing the paths connecting corresponding nodes that are not associated with the parking lot, the suggestion system 115 may ensure that the node corresponding to the meeting point is associated with a parking lot at which the passenger may park the vehicle 110.

Figure 1H:
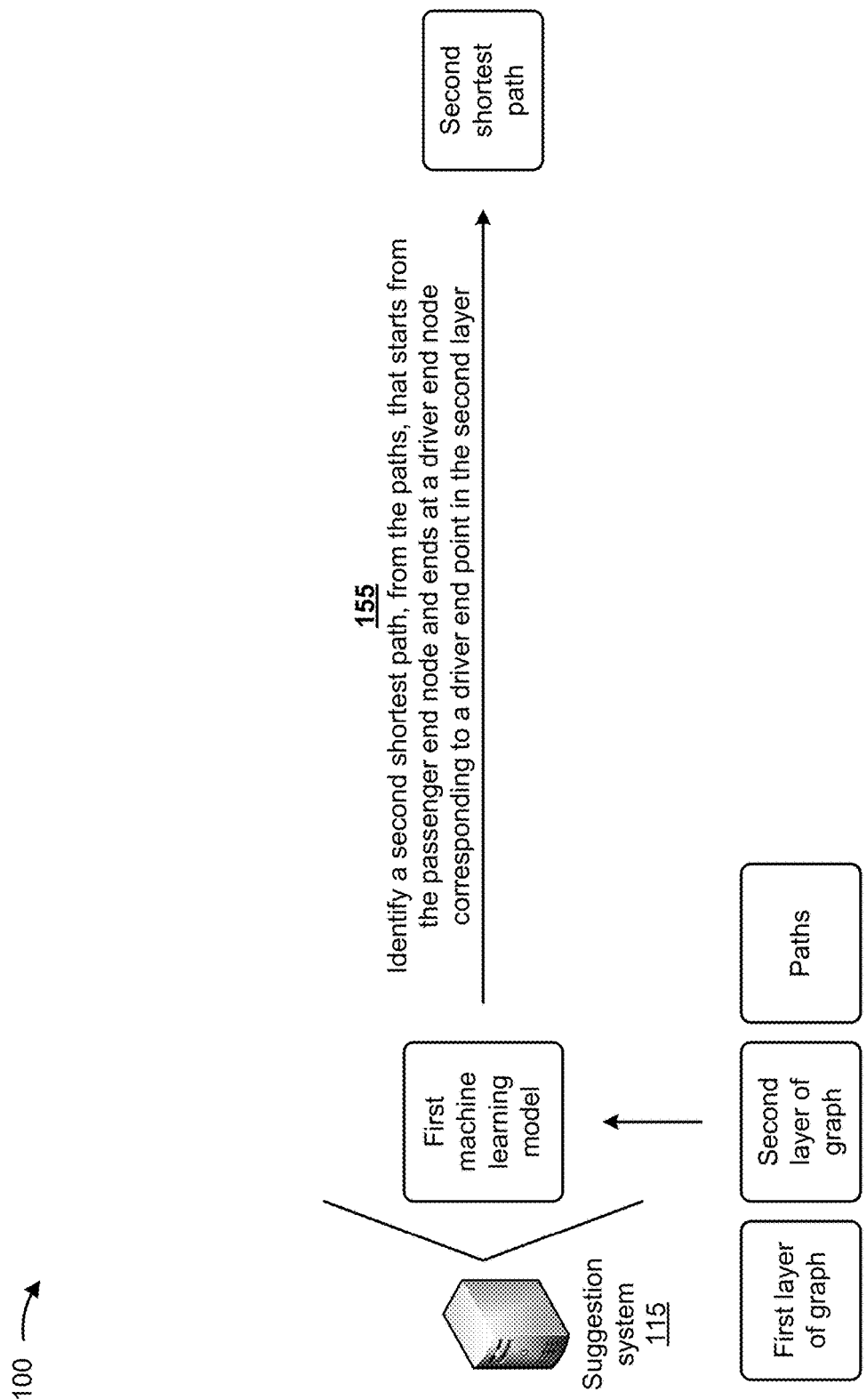

As shown in FIG. 1H, and by reference number 155, the suggestion system 115 utilizes the first machine learning model to identify a second shortest path, from the paths, that starts from the passenger end node (e.g., a node corresponding to the ending location of the recurrent trip) and ends at a driver end node (e.g., a node corresponding to the ending location of the other recurrent trip) corresponding to a driver end point in the second layer. For example, the suggestion system 115 may determine a second shortest path for the driver to travel from a location at which the passenger is dropped off to a destination of the driver. The second shortest path may correspond to a shortest path in terms of distance and/or time.

Figure 1I:
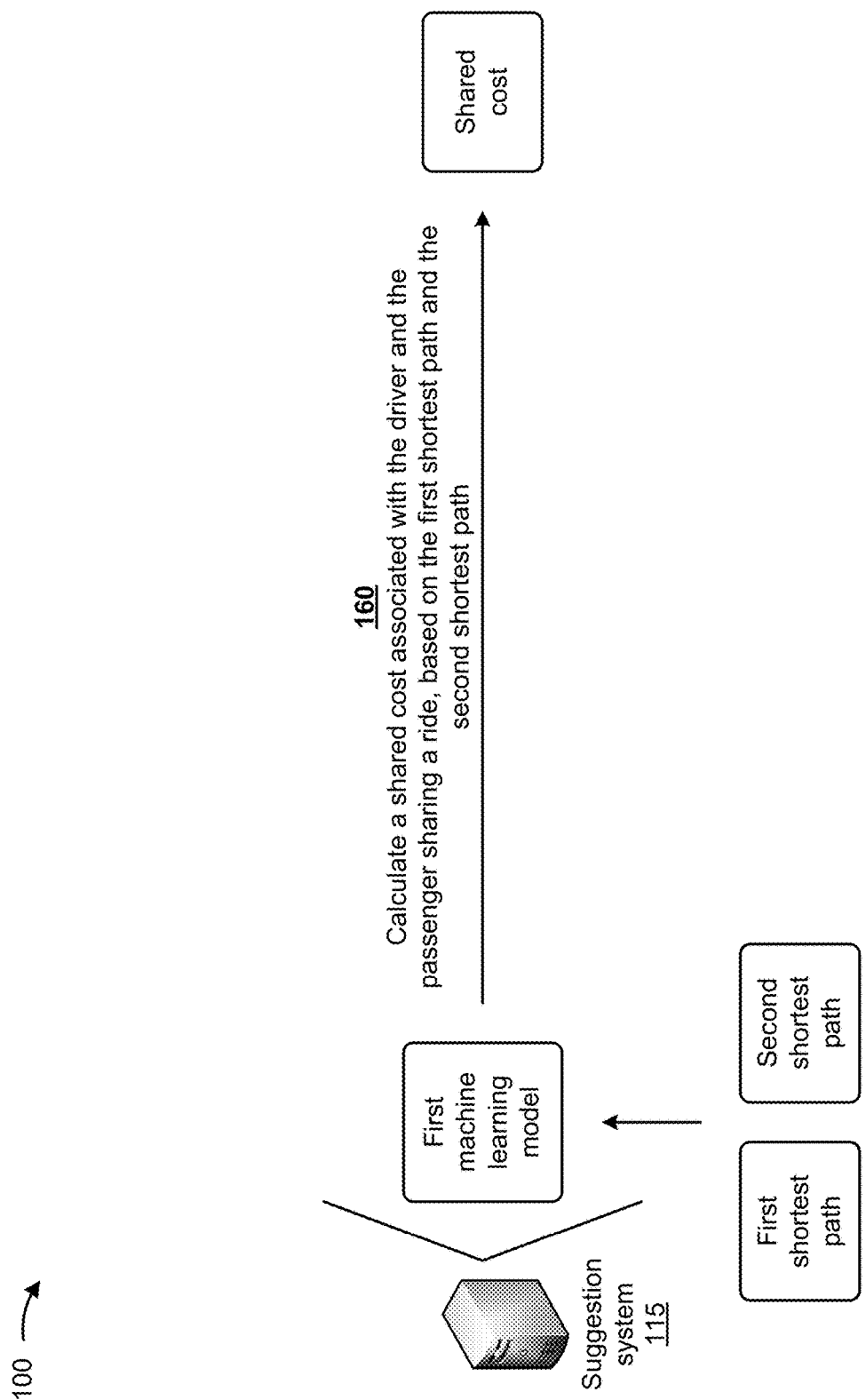

As shown in FIG. 1I, and by reference number 160, the suggestion system 115 utilizes the first machine learning model to calculate a shared cost associated with the driver and the passenger sharing a ride based on the first shortest path and the second shortest path. The shared cost may represent a total distance traveled and/or a total amount of time for the driver to travel to the meeting point, for the passenger to travel to the meeting point (which may equal zero when the meeting point corresponds to a starting location of the recurrent trip (e.g., a home of the passenger)), for the driver and the passenger to travel together to the passenger's destination, and the driver to travel from the passenger's destination to the driver's destination.

Figure 1J:
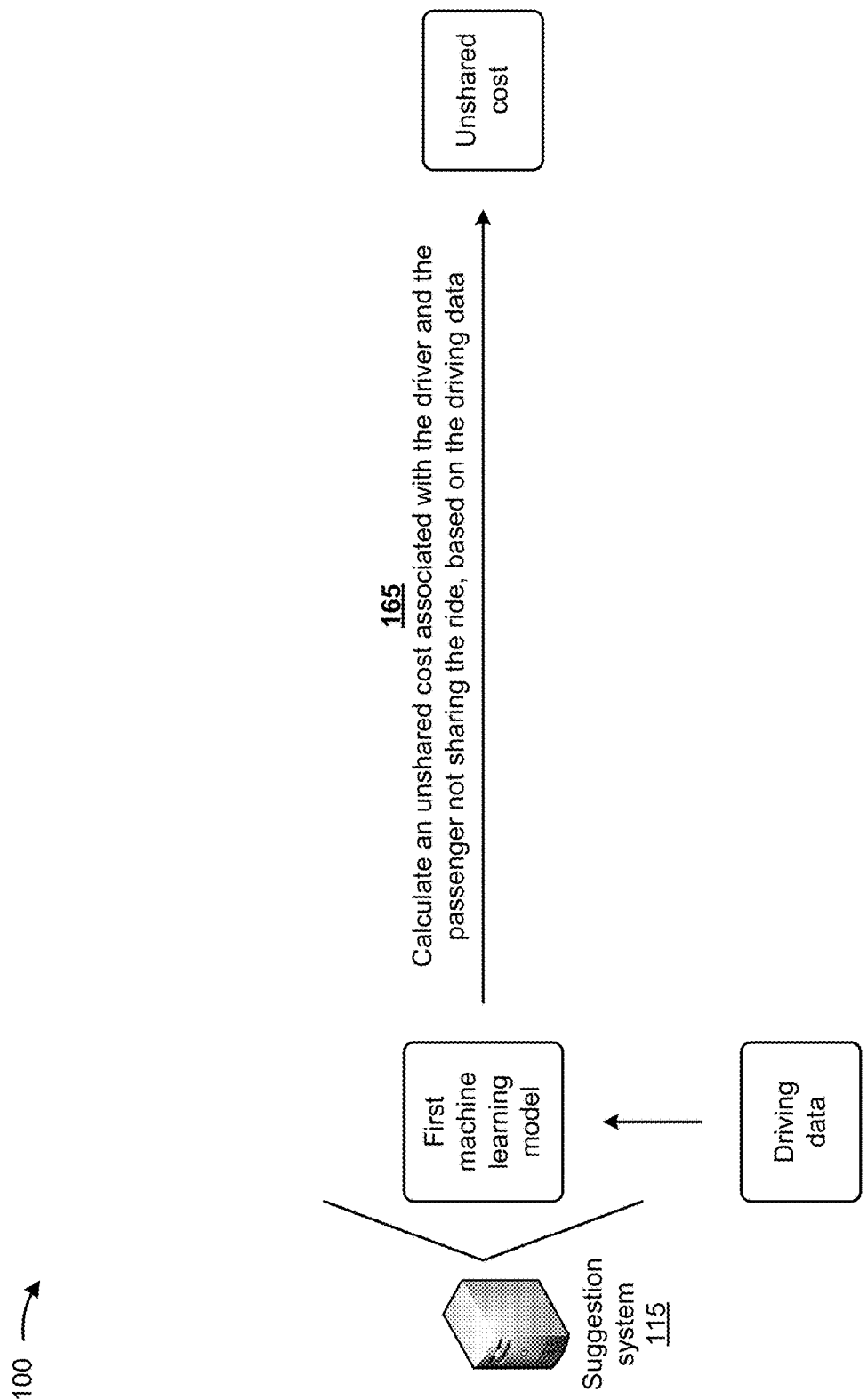

As shown in FIG. 1J, and by reference number 165, the suggestion system 115 utilizes the first machine learning model to calculate an unshared cost associated with the driver and the passenger not sharing the ride based on the driving data. The unshared cost may include a cost associated with the driver driving from the starting location of the other recurrent trip to the ending location of the other recurrent trip and a cost associated with the passenger driving from a starting location of the recurrent trip to the ending location of the recurrent trip.

Figure 1K:
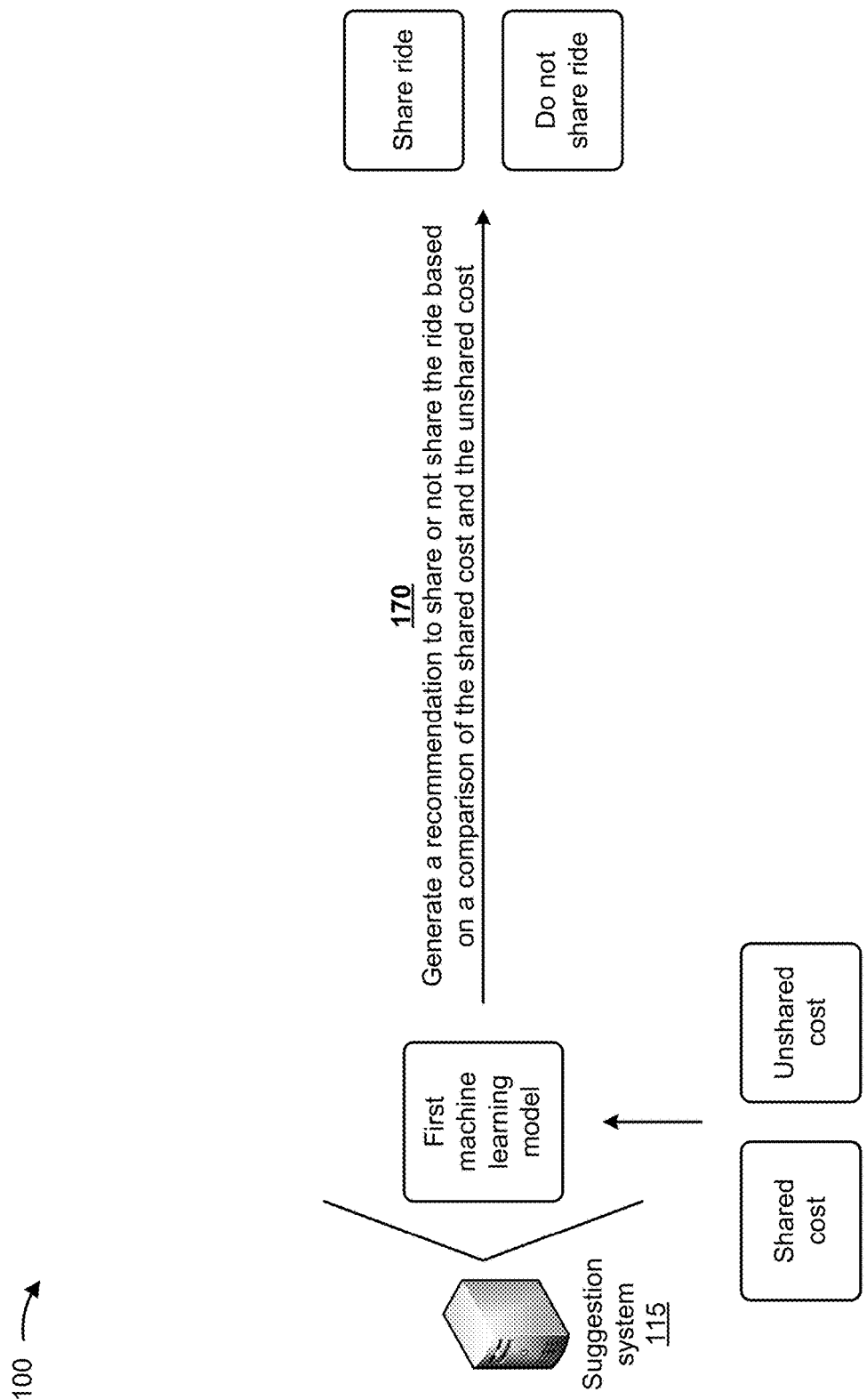

As shown in FIG. 1K, and by reference number 170, the suggestion system 115 utilizes the first machine learning model to generate a recommendation to share or not share the ride based on a comparison of the shared cost and the unshared cost. In some implementations, the suggestion system 115 determines that the shared cost is greater than the unshared cost. The suggestion system 115 may generate a recommendation that the user and the potential match should not share the ride based on the shared cost being greater than the unshared cost. The suggestion system 115 may determine another potential match and may utilize the first machine learning model to determine whether the user and the other potential match should share a ride in a manner similar to that described above based on the shared cost being greater than the unshared cost and/or based on generating the recommendation that the user and the potential match should not share the ride.

In some implementations, the suggestion system 115 determines that the shared cost is less than the unshared cost. The suggestion system 115 may generate a recommendation that the user and the potential match should share the ride based on the shared cost being less than the unshared cost.

As shown in FIGS. 1L-1P, the suggestion system 115 may utilize a second machine learning model to determine potential matches for a group of users. In some implementations, the group of users are associated with similar recurrent trips. For example, suggestion system 115 may determine a recurrent trip for the plurality of users associated with the driving data in a manner similar to that described above with respect to FIG. 1B. The suggestion system 115 may determine a group of users associated with recurrent trips associated with the same or adjacent day boxes, the same or adjacent starting time boxes, the same or adjacent ending time boxes, the same or adjacent starting location boxes, and/or the same or adjacent ending location boxes.

Figure 1L:
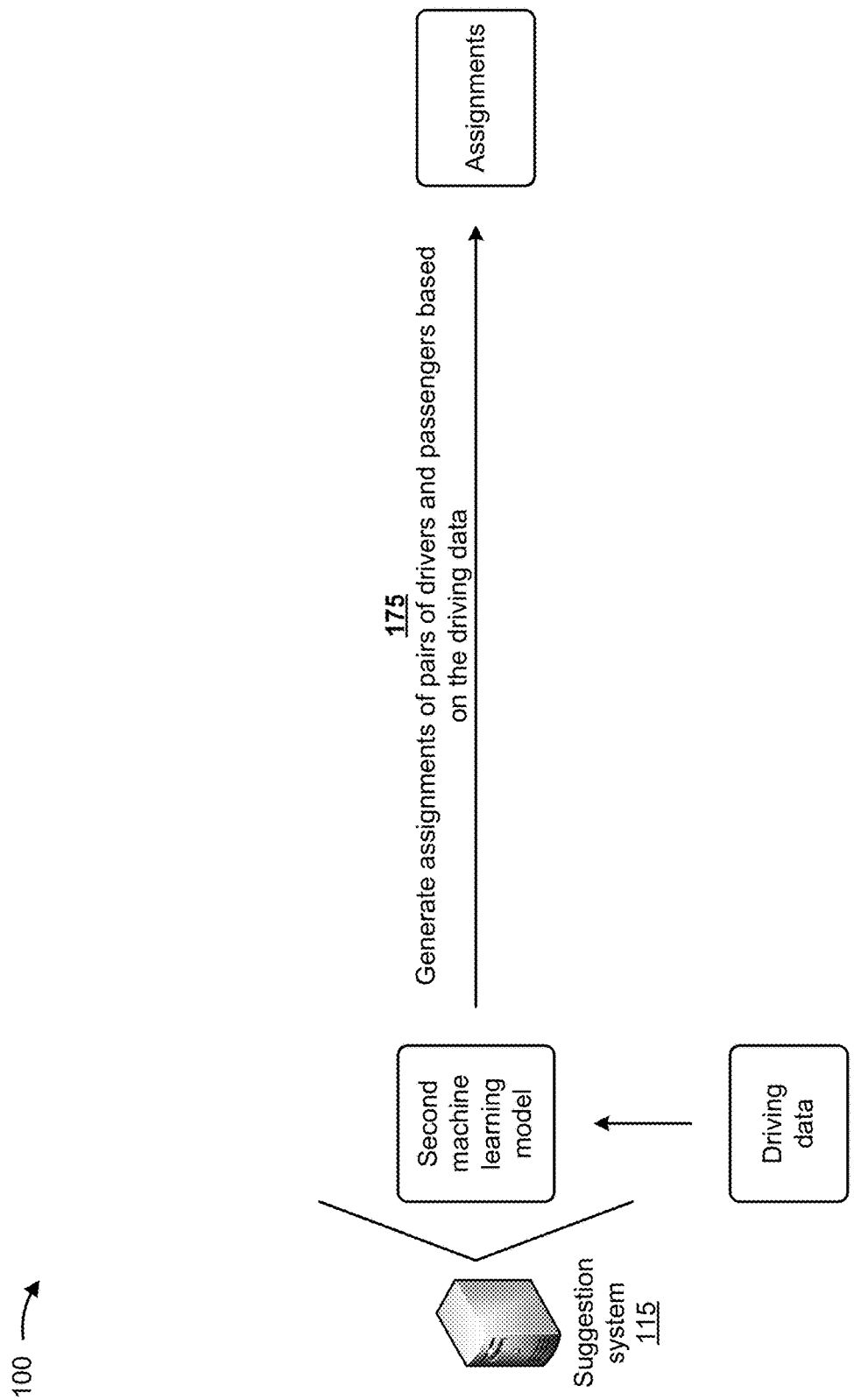

As shown in FIG. 1L, and by reference number 175, the suggestion system 115 utilizes the second machine learning model to generate assignments of pairs of drivers and passengers (e.g., driver-passenger pairs) from the group of users based on driving data associated with the group of users. In some implementations, the suggestion system 115 randomly generates the assignments of driver-passenger pairs.

In some implementations, the suggestion system 115 generates the assignments of driver-passenger pairs based on starting locations and/or ending locations of the recurrent trips associated with the group of users. For example, the suggestion system 115 may assign a first user and a second user as a driver-passenger pair based on determining that the first user is associated with a recurrent trip that has a starting location and/or an ending location that is closest to a starting location and/or an ending location of a recurrent trip associated with the second user relative to a starting location and/or an ending location of recurrent trips associated with other users. The suggestion system 115 may continue generating assignments of driver-passenger pairs in a similar manner for the remaining users included in the group of users.

In some implementations, the suggestion system 115 determines a set of driver-passenger pairs that includes all possible driver-passenger pairs for the group of users. The suggestion system 115 utilizes the first machine learning model to determine a shared cost associated with sharing a ride for each of the possible driver-passenger pairs in a manner similar to that described above.

The suggestion system 115 generates the assignment of driver-passenger pairs based on the shared cost determined for each possible driver-passenger pair. For example, the suggestion system 115 may select the driver-passenger pair associated with the lowest shared cost from the set of driver-passenger pairs. The suggestion system 115 may form a modified set of driver-passenger pairs by eliminating each possible driver-passenger pair from the set of driver-passenger pairs that includes the driver and/or the passenger included in the selected driver-passenger pair. The suggestion system 115 may select the driver-passenger pair associated with the lowest shared cost from the modified set of driver-passenger pairs. The suggestion system 115 may continue selecting driver-passenger pairs in a similar manner until each user is assigned to a driver-passenger pair.

Figure 1M:
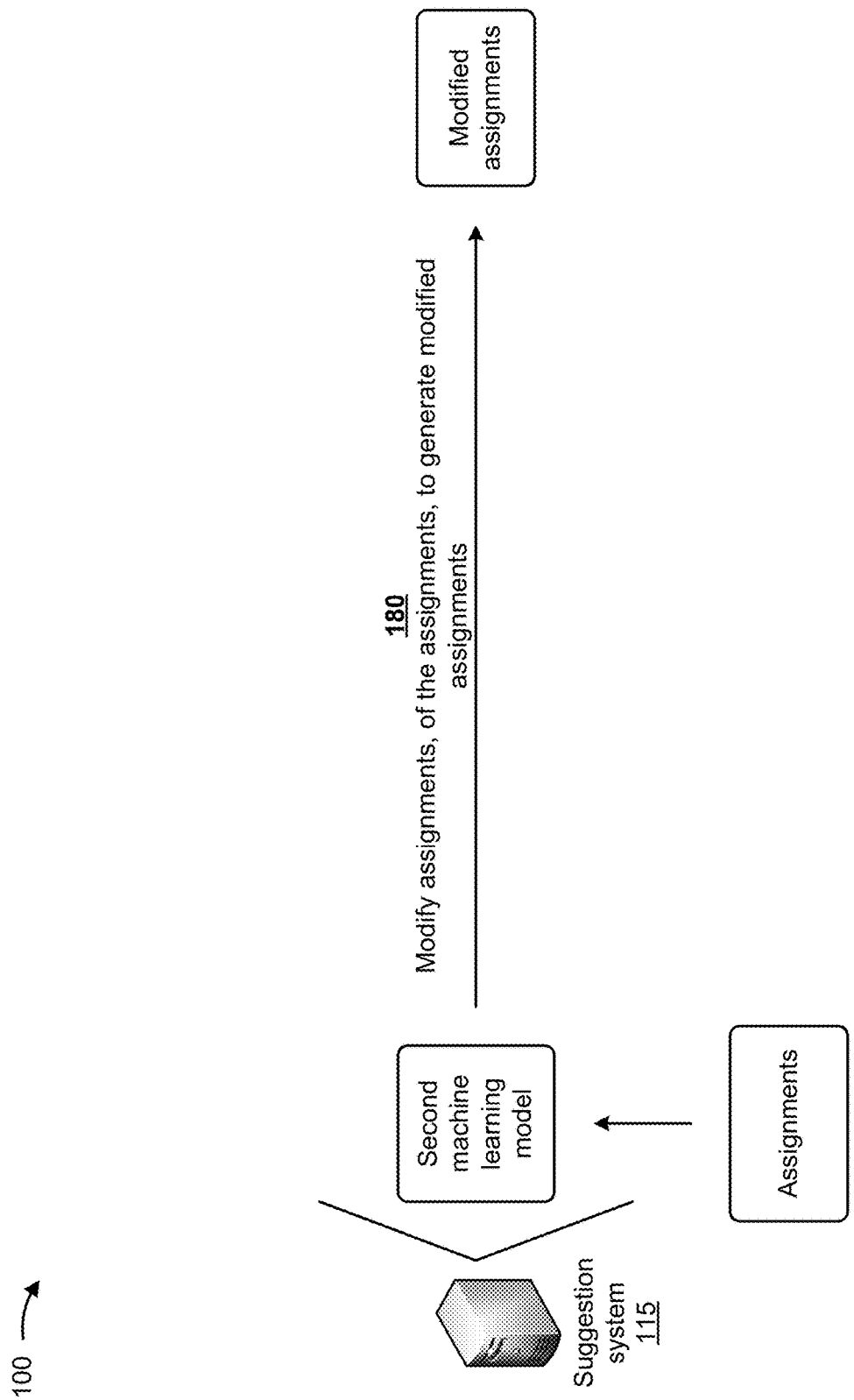

As shown in FIG. 1M, and by reference number 180, the suggestion system 115 utilizes the second machine learning model to modify assignments of the assigned driver-passenger pairs to generate modified assignments of driver-passenger pairs. For example, the assignments of the driver-passenger pairs described above with respect to FIG. 1L may be referred to as a solution. The suggestion system 115 modify the solution based on a neighborhood.

A neighborhood is defined as a set of solutions that can be obtained by performing a modification to the solution. For example, a neighborhood may include a first modified solution generated based on performing a first modification to the solution, a second modified solution generated based on performing a second modification to the solution, a third modified solution generated based on performing a third modification to the solution, and the like. The first modification may include selecting a first driver-passenger pair and a second driver-passenger pair from the solution and assigning the driver of the first driver-passenger pair as the driver of the second driver-passenger pair and assigning the driver of the second driver-passenger pair as the driver of the first driver-passenger pair. The second modification may include selecting a third driver-passenger pair and a fourth driver-passenger pair from the solution and assigning the passenger of the first driver-passenger pair as the passenger of the second driver-passenger pair and assigning the passenger of the second driver-passenger pair as the passenger of the first driver-passenger pair. The third modification may include assigning the driver of a particular driver-passenger pair as the passenger and assigning the passenger of the particular driver-passenger pair as the driver.

Figure 1N:
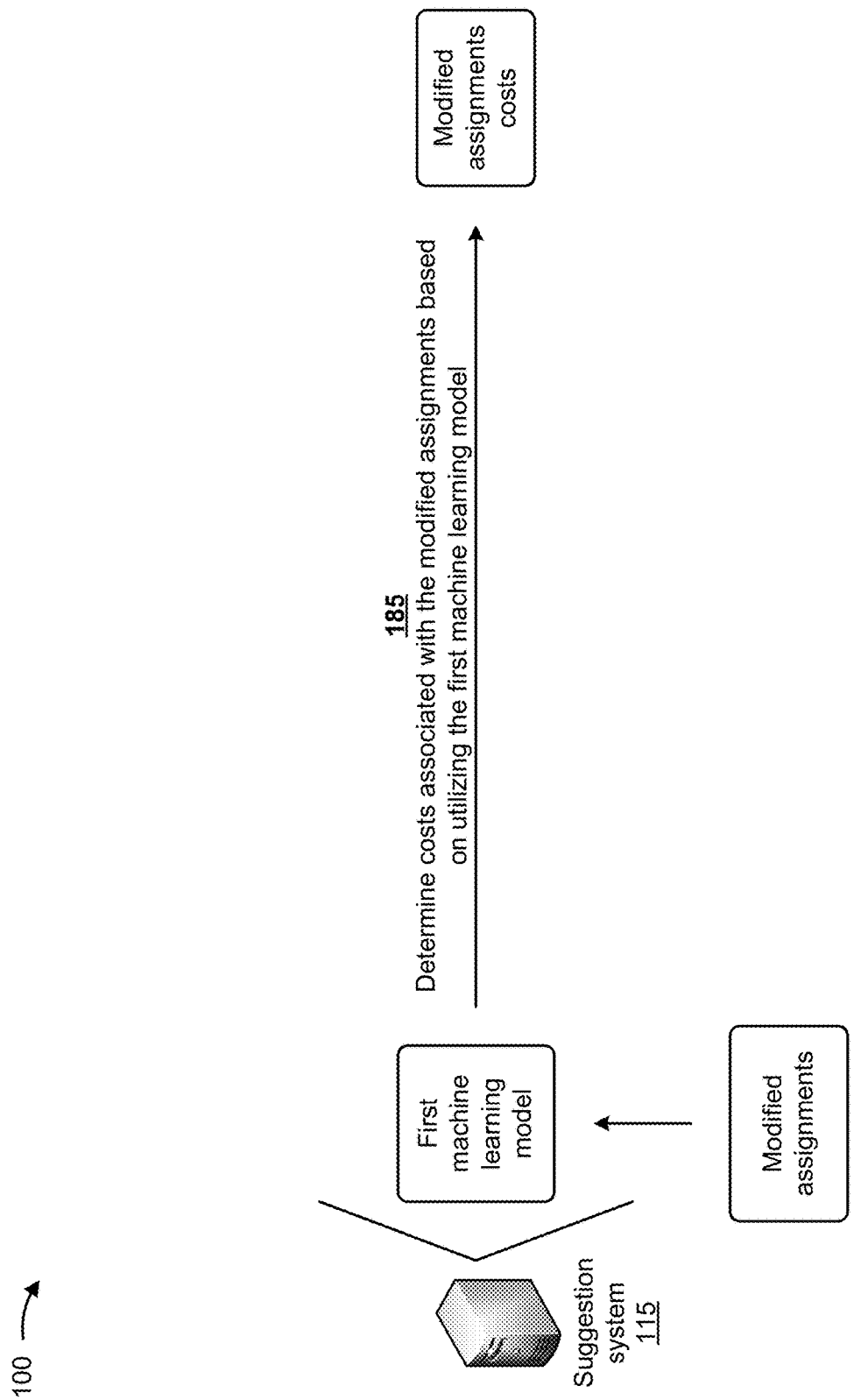
Figure 10:
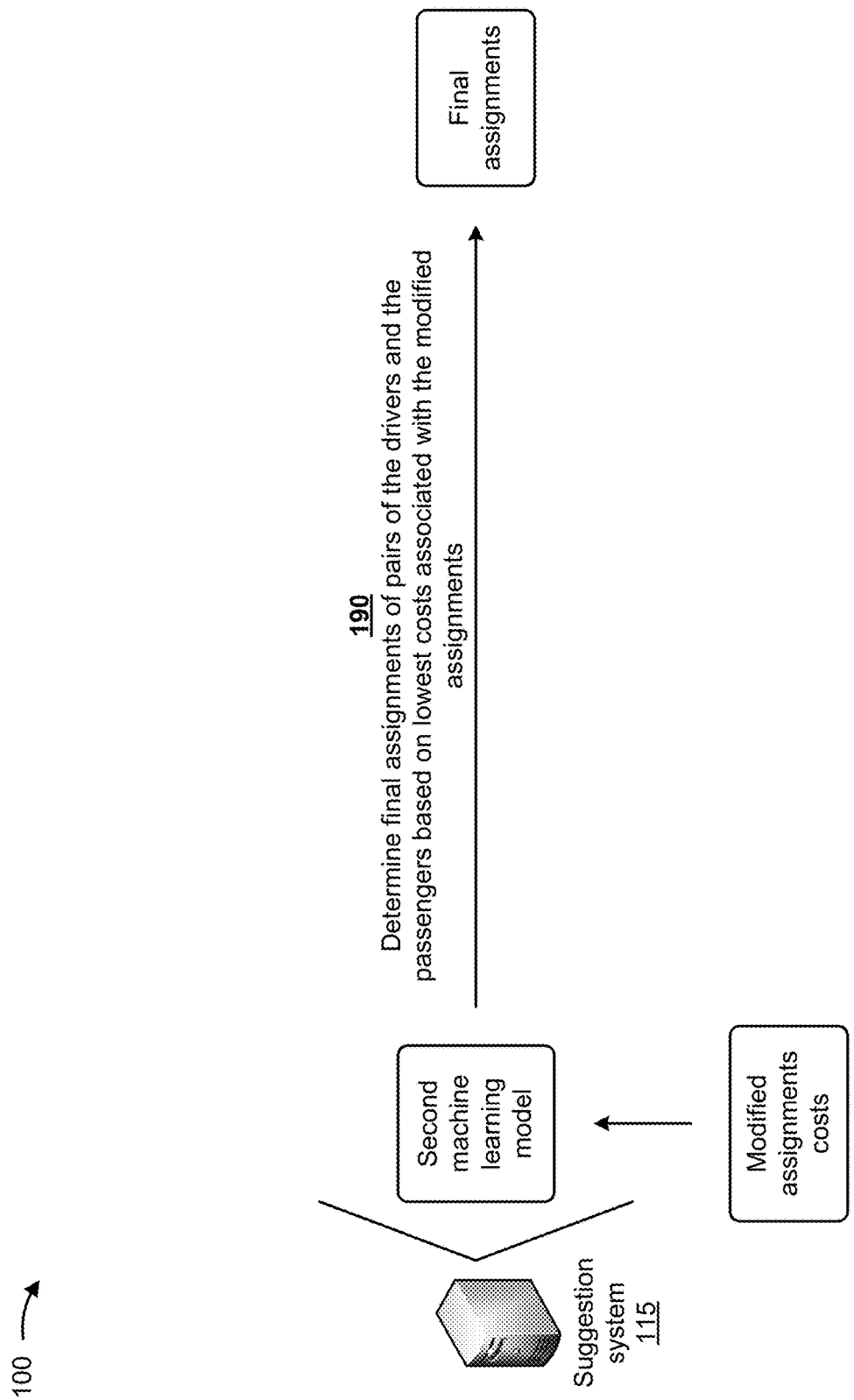

The suggestion system 115 may modify the solution based on a cost associated with each modified solution included in the neighborhood. For example, as shown in FIG. 1N, and by reference number 185, the suggestion system 115 may determine a cost associated with the modified assignments (e.g., the first modified solution, the second modified solution, the third modified solution, and/or the like) based on utilizing the first machine learning model.

In some implementations, the suggestion system 115 may determine the shared cost associated with each driver-passenger pair, included in each modified solution in a manner similar to that described above with respect to FIGS. 1C-1I. The suggestion system 115 may determine the cost associated with each modified solution based on the shared cost determined for each driver-passenger pair included in the respective modified solutions (e.g., a sum of the shared costs).

For example, the first modified solution may include a first driver-passenger pair and a second driver passenger pair. The suggestion system 115 may determine the shared cost associated with the first driver-passenger pair is equal to a first cost and that the shared cost associated with the second driver-passenger pair is equal to a second cost. The suggestion system 115 may determine a cost associated with the first modified solution is equal to a sum of the first cost and the second cost.

As shown in FIG. 1O, and by reference number 190, the suggestion system 115 utilizes the second machine learning model to determine final assignments of driver-passenger pairs based on the lowest costs associated with the modified assignments. For example, the suggestion system 115 may determine a modified solution included in the neighborhood that is associated with a lowest cost. The suggestion system 115 may generate final assignments of driver-passenger pairs based on the driver-passenger pairs included in the modified solution.

In some implementations, the suggestion system 115 determines the final assignments of driver-passenger pairs based on performing iterations of modifications. For example, the suggestion system 115 may determine a modified solution included in the neighborhood that is associated with the lowest cost. The suggestion system 115 may modify the modified solution in a manner similar to that described above with respect to modifying the solution.

In some implementations, the suggestion system 115 excludes a modification in one iteration that would undo a modification made in a previous iteration. For example, the suggestion system 115 may assign the driver of the first driver-passenger pair as the driver of the second driver-passenger pair and may assign the driver of the second driver-passenger pair as the driver of the first driver-passenger pair in the first iteration. The suggestion system 115 may exclude a modification that includes assigning the passenger of the first driver-passenger pair as the passenger of the second driver-passenger pair and assigning the passenger of the second driver-passenger pair as the passenger of the first driver-passenger pair in a second iteration because it would undo the modification made in the first iteration. In this way, the suggestion system 115 may prevent a loop in which the solution continuously alternates between two modified solutions.

In some implementations, the suggest system 115 modifies the solution by performing a perturbation. A perturbation may be a modification to the solution that significantly changes the solution. The perturbation may be performed even if applying the perturbation causes a cost associated with solution to increase. The suggestion system 115 may perform multiple iterations of modifications based on performing the perturbation that may result in a modified solution associated with a cost lower than a modified solution that may be obtained if the perturbation were not performed.

In some implementations, the suggestion system 115 determines the final assignment of driver-passenger pairs based on performing a predetermined number of iterations of modifications (e.g., 2, 10, 100, and/or the like), based on an amount of time having elapsed (e.g., 30 seconds, 1 minute, 5 minutes, 1 hour, and/or the like), based on a cost associated with a modified solution satisfying (e.g., being less than) a threshold cost, and/or the like. The suggestion system 115 may determine the modified solution, generated in any of the iterations of modifications, associated with the lowest cost. The suggestion system 115 may determine the final assignment of driver-passenger pairs based on the driver-passenger pairs included in the modified solution associated with the lowest cost.

As shown in FIG. 1P, and by reference number 195, the suggestion system 115 performs one or more action based on the final assignments of driver-passenger pairs. In some implementations, the one or more actions may include the suggestion system 115 providing a suggestion to share a ride with a particular passenger to a device of a driver and/or providing a suggestion to share a ride with a particular driver to a device of a passenger. For example, the suggestion system 115 may cause a particular vehicle device 105 of the driver and/or the passenger to display (e.g., via a user interface) information identifying the passenger, information identifying the driver, information identifying a location for meeting the particular passenger (e.g., a meeting point), a representation of the meeting point (e.g., as an indicator on a map, as text on a list, and/or the like), and/or the like.

In some implementations, the one or more actions may include providing a recommendation to establish and/or modify a form of public transportation. For example, the suggestion system 115 may identify a quantity of recurrent trips that could be shared utilizing a single vehicle. The suggestion system 115 may determine a type of vehicle (e.g., a van, a bus, a train, and/or the like) having a capacity sufficient to transport a quantity of users associated with the quantity of recurrent trips. The suggestion system 115 may determine one or more passenger pick-up locations corresponding to one or more meeting points determined based on computing the shortest path tree, as described above. The suggestion system 115 may provide a recommendation to establish and/or modify a form of public transportation that includes information identifying the quantity of recurrent trips, information identifying the type of vehicle, information identifying the meeting points, and/or the like.

In some implementations, the one or more actions may include providing information identifying one or more delivery routes. For example, each recurrent trip may correspond to a delivery to be made on a particular day. For example, the recurrent trip may be defined by a starting location corresponding to a current location of an item to be delivered (e.g., a warehouse, a port of entry, a train depot, and/or the like), an ending location corresponding to a location to which the item is to be delivered (e.g., a delivery address), and ending time corresponding to a time at which the item is to be delivered, and/or the like. The suggestion system 115 may analyze the delivery routes to determine a quantity of delivery vehicles required to deliver the items, items to be delivered by the same delivery vehicle, routes to be traveled by the delivery vehicles, and/or the like.

In some implementations, the suggestion system 115 may provide the suggestions to an application running in the background on a mobile device (e.g., a vehicle device 105). The application may cause a notification to be provided to alert the driver and/or the passenger of the opportunity to share a ride. The driver and/or the passenger may open the application to obtain additional information regarding sharing a ride (e.g., profile information associated the driver and/or the passenger, an indication of a fuel savings if the cost of fuel is shared, a map indicating the shared ride, and/or the like).

In this way, the suggestion system 115 may proactively suggest potential matches to users of a ride sharing system. Because the potential matches are determined based on driving data obtained by vehicle devices 105, the suggestion system 115 ensures that the potential matches are determined based on accurate trip information. By determining the potential match based on accurate trip information, the suggestion system 115 may increase a likelihood that the driver and the passenger will share a ride. In this way, the suggestion system 115 may conserve computing resources that would otherwise be utilized to determine another potential match for the driver and/or passenger.

In some implementations, the one or more actions may include the suggestion system 115 providing directions for a suggested ride share with a particular passenger to a device of a driver and/or providing directions for sharing a ride with a particular driver to a device of a passenger. For example, the suggestion system 115 may cause a particular vehicle device 105 of the driver and/or the passenger to display (e.g., via the user interface) a representation of a location at which the passenger and the driver are to meet (e.g., a meeting point) as an indicator on a map, as text on a list, and/or the like. In this way, the suggestion platform 115 may enable a driver and a passenger to quickly and efficiently identify and/or travel to a meeting point to begin sharing a ride, which may save time for the driver and/or the passenger and conserve resources (e.g., computing resources, networking resources, energy resources, and/or the like) that would otherwise be utilized by the driver and/or the passenger to determine and/or identify a meeting point.

In some implementations, the one or more actions may include the suggestion system 115 providing information identifying a cost savings associated with the final assignments of driver-passenger pairs to one or more devices of the passengers and/or to one or more devices of the drivers. For example, the suggestion system 115 may cause a vehicle device 105 of the driver and/or the passenger to display (e.g., via the user interface) information identifying an unshared cost associated with the driver and/or the passenger traveling separately, information identifying a shared cost associated with the driver and the passenger sharing a ride, information identifying a difference between the unshared cost and the shared cost (e.g., a cost savings), information identifying a fuel savings associated with sharing a ride, and/or the like. By providing the information identifying the cost savings, the suggestion system 115 may increase a likelihood that the driver and the passenger will share a ride, thereby conserving computing resources that would otherwise be utilized to determine another potential match for the driver and/or the passenger.

In some implementations, the one or more actions may include the suggestion system 115 providing information for accepting the ride sharing arrangement. For example, the suggestion system 115 may cause the application to provide an input that the driver and/or the passenger can select to accept the ride sharing arrangement.

In some implementations, the one or more actions may include the suggestion system 115 providing information suggestion a price that the passenger should pay the driver based on sharing a ride with the driver. For example, the suggestion system 115 may price information associated with the share ride such as a type of vehicle utilized by the driver, a fuel consumption associated with the type of vehicle, a distance of the shared ride, a fuel cost associated with the shared ride, and/or the like. The suggestion system 115 may determine a price that the passenger should pay to the driver based on the price information.

In some implementations, the one or more actions may include the suggestion system 115 retraining the first machine learning model and/or the second machine learning model based on the final assignments of driver-passenger pairs. For example, the suggestion system 115 may utilize the final assignments of driver-passenger pairs and/or information indicating whether the driver-passenger pairs shared a ride to retrain the first machine learning model and/or the second machine learning model. In this way, an accuracy of the final assignments of driver-passenger pairs may be increased.

By utilizing driving information obtained from vehicle devices, the suggestion system ensures that accurate trip information is input into an algorithm used to determine potential ride sharing matches thereby conserving computing resources relative to systems that utilize user provided trip information. The suggestion system ensures that a cost associated with the shared trip (e.g., a distance traveled, a travel time, and/or the like) is less than a cost associated with each user utilizing their own vehicle to reach their respective destinations. In this way, the suggestion system increases a likelihood that potential matches will ride share thereby conserving computing resources that otherwise would be utilized by a user performing multiple searches for potential ride sharing matches. Further, increasing the likelihood that potential matches will ride share may reduce the number of vehicles thereby reducing fuel consumption and carbon dioxide emissions.

As indicated above, FIGS. 1A-1P are provided as an example. Other examples may differ from what is described with regard to FIGS. 1A-1P. The number and arrangement of devices shown in FIGS. 1A-1P are provided as an example. In practice, there may be additional devices, fewer devices, different devices, or differently arranged than those shown in FIGS. 1A-1P. Furthermore, two or more devices shown in FIGS. 1A-1P may be implemented within a single device, or a single device shown in FIGS. 1A-1P may be implemented as multiple, distributed devices. Additionally, or alternatively, a set of devices (e.g., one or more devices) shown in FIGS. 1A-1P may perform one or more functions described as being performed by another set of devices shown in FIGS. 1A-1P.

Figure 2:
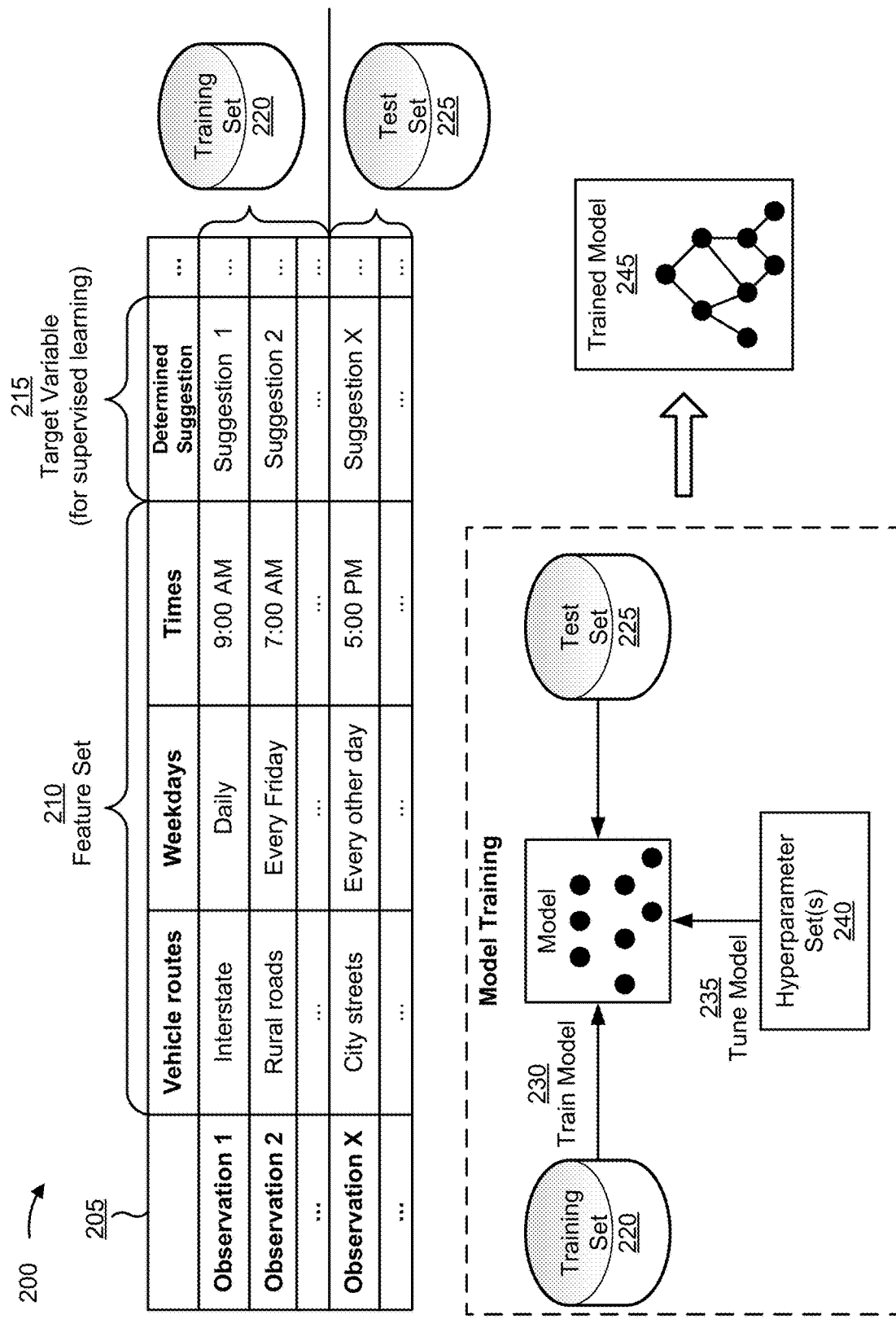
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as suggestion system 115.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to a ride sharing website or application associated with the suggestion system 115, as described elsewhere herein. In some implementations, the machine learning system may receive the set of observations (e.g., as input) from vehicle device 105.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from vehicle devices 105. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from vehicle devices 105, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of vehicle routes, a second feature of weekdays, a third feature of times, and so on. As shown, for a first observation, the first feature may have a value of interstate, the second feature may have a value of daily, the third feature may have a value of 9:00 am, and so on. These features and feature values are provided as examples, and may differ in other examples. For example, the feature set may include one or more of the following features: a starting location, an ending location, a starting time, an ending time, a type of vehicle, a number of passengers a vehicle is able to accommodate, route restrictions (e.g., one way street, detour, information indicating a road is closed for a certain period of time, information indicating construction is being performed on a particular road, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the training set 220 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
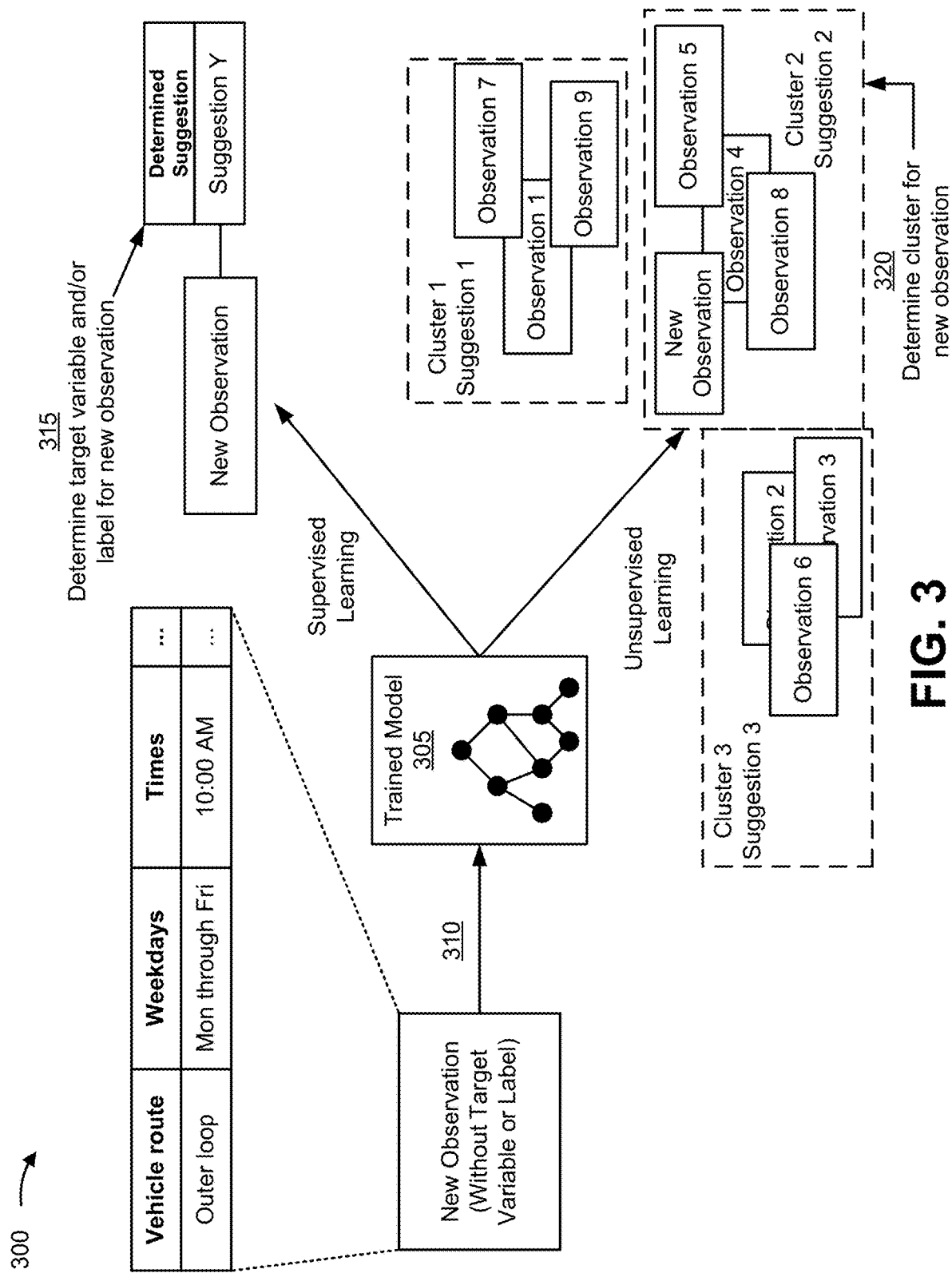
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as suggestion system 115.

As shown by reference number 310, the machine learning system may receive a new observation (or a set of new observations), and may input the new observation to the machine learning model 305. As shown, the new observation may include a first feature of vehicle route, a second feature of weekdays, a third feature of times, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of suggestion Y (e.g., the name of a potential match) for the target variable of determined suggestion for the new observation, as shown by reference number 315. Based on this prediction (e.g., based on the value having a particular label/classification, based on the value satisfying or failing to satisfy a threshold, and/or the like), the machine learning system may provide a recommendation, such as that a user and a potential match should share a ride, that a user and a potential match should not share a ride, a shared cost associated with the user and the potential match sharing a ride, an unshared cost associated with the user and the potential match traveling separately, and/or the like. Additionally, or alternatively, the machine learning system may perform an automated action and/or may cause an automated action to be performed (e.g., by instructing another device to perform the automated action), such as providing a suggestion to share a ride with a potential match to a device of a user, provide directions for a suggested ride share with a potential match to a device of a user, provide instructions for sharing a ride with a potential match to a device of a user, provide information identifying cost savings associated with sharing a ride with a potential match to a device of a user, determining another potential match for a user, and/or the like.

In some implementations, the trained machine learning model 305 may classify (e.g., cluster) the new observation in a cluster, as shown by reference number 320. The observations within a cluster may have a threshold degree of similarity. Based on classifying the new observation in the cluster, the machine learning system may provide a recommendation, such as a suggestion to determine potential matches based on observations included in the cluster, a suggestion to determine recurrent trips based on observations included in the cluster, and/or the like. Additionally, or alternatively, the machine learning system may perform an automated action and/or may cause an automated action to be performed (e.g., by instructing another device to perform the automated action), such as generating assignments of driver-passenger pairs based on observations included in the cluster, determining recurrent trips based on observations included in the cluster, and/or the like.

In this way, the machine learning system may apply a rigorous and automated process to determining recurrent trips and/or generating assignments of driver-passenger pairs. The machine learning system enables recognition and/or identification of tens, hundreds, thousands, or millions of features and/or feature values for tens, hundreds, thousands, or millions of observations, thereby increasing an accuracy and consistency of determining recurrent trips and/or generating assignments of driver-passenger pairs relative to requiring computing resources to be allocated for tens, hundreds, or thousands of operators to manually determining recurrent trips and/or generating assignments of driver-passenger pairs using the features or feature values.

As indicated above, FIG. 3 is provided as an example. Other examples may differ from what is described in connection with FIG. 3.

Figure 4:
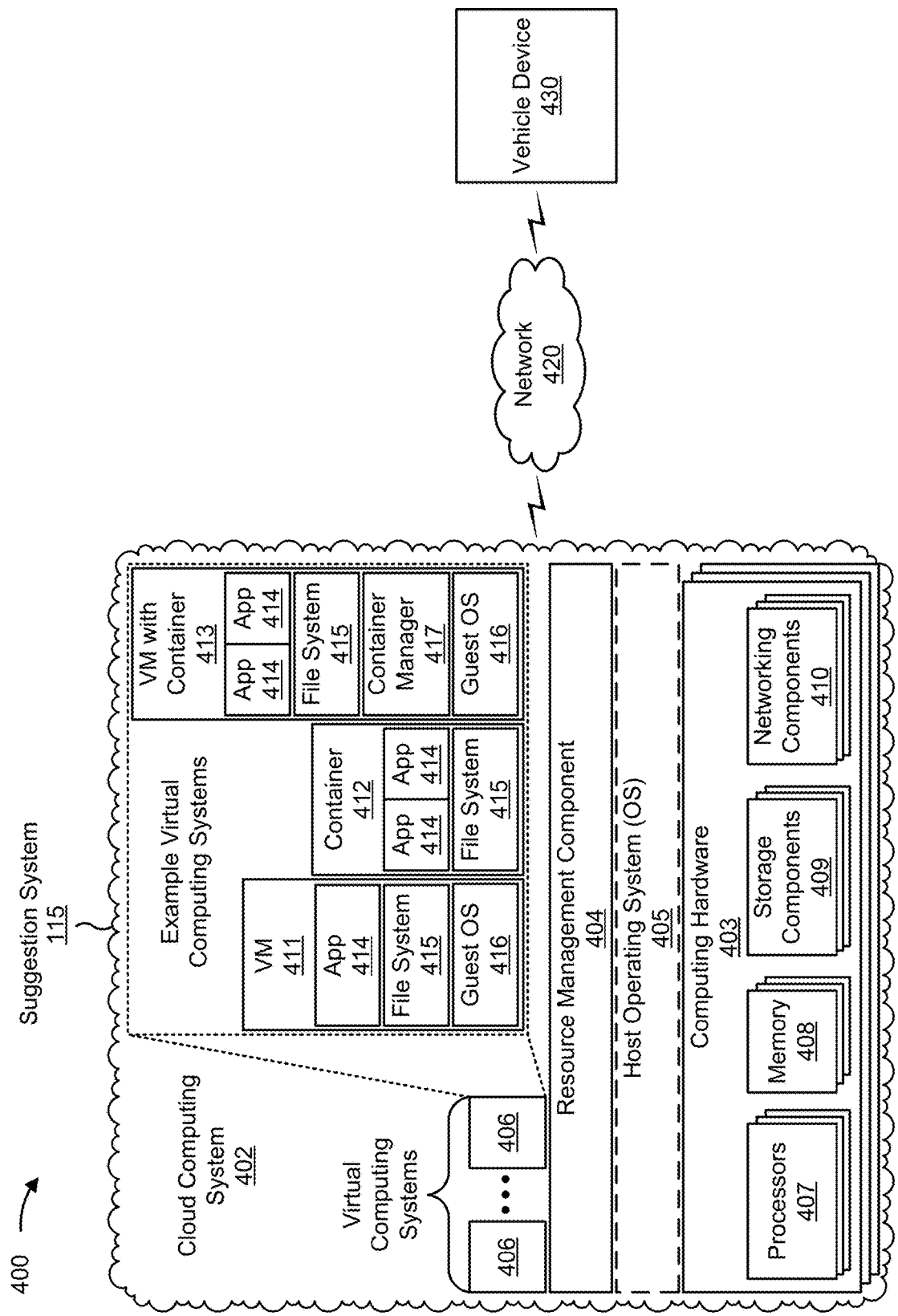
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a suggestion system 115. The suggestion system 115 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420 and a vehicle device 430. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the suggestion system 115 to perform one or more operations or processes described herein. A storage component 409 includes a hard disk or another type of storage device that stores information, data, and/or software (e.g., code, instructions, and/or the like) related to the operation and use of the suggestion system 115. In some implementations, memory 408 and/or storage component 409 is/are implemented as a non-transitory computer readable medium. A networking component 410 includes a network interface and corresponding hardware that enables the suggestion system 115 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the suggestion system 115 may include one or more elements 403-417 of the cloud computing system 402, may execute within the cloud computing system 402, and/or may be hosted within the cloud computing system 403, in some implementations, the suggestion system 115 may not be cloud-based (e.g., may be implemented outside of a cloud computing system) or may be partially cloud-based. For example, the suggestion system 115 may include one or more devices that are not part of the cloud computing system 402, such as device 500 of FIG. 5, which may include a standalone server or another type of computing device. The suggestion system 115 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The vehicle device 430 may include one or more devices capable of receiving, generating, storing, processing, and/or providing information, such as information described herein. For example, vehicle device 430 may include a device included in vehicle 110 for obtaining data associated with the vehicle 110 traveling along a route such as an inertial measurement unit, a three-axis accelerometer, a gyroscope, a global positioning system (GPS) device, an OBD device, an ECU, a dash camera, a parking assist camera, a backup assist camera, and/or the like.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
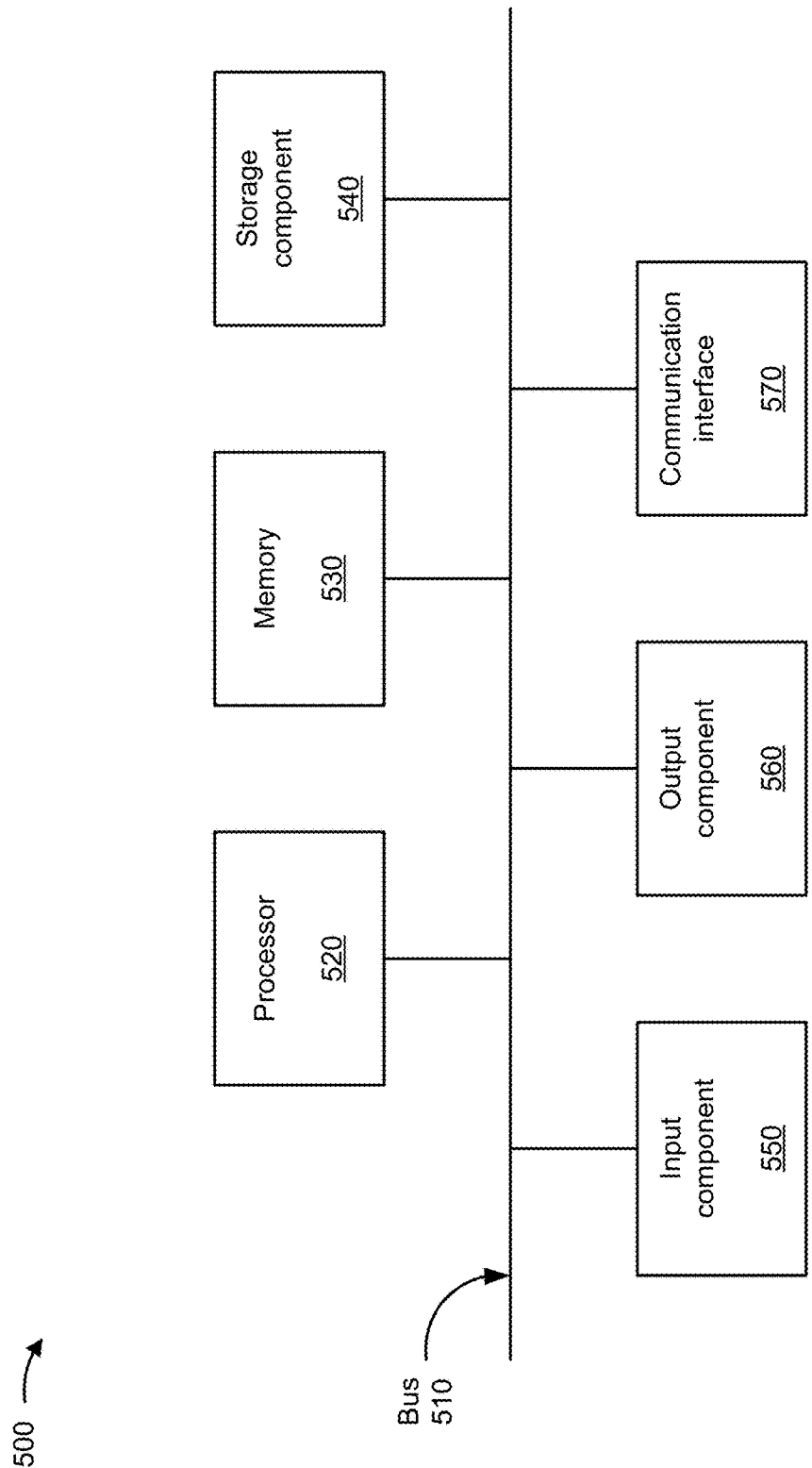
FIG. 5 is a diagram of example components of one or more devices of FIG. 4.

FIG. 5 is a diagram of example components of a device 500. Device 500 may correspond to suggestion system 115 and/or vehicle device 430. In some implementations, suggestion system 115 and/or vehicle device 430 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
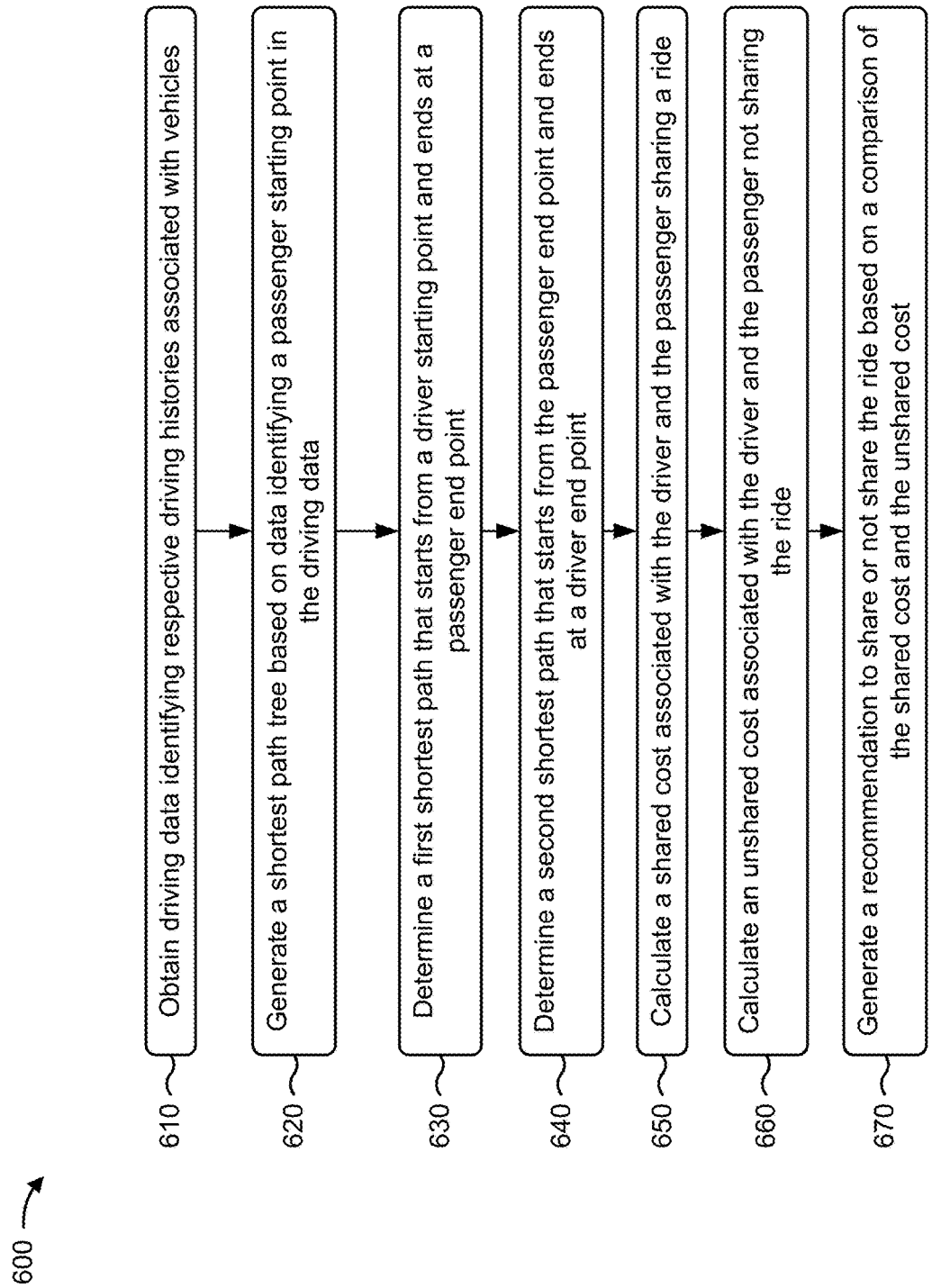
FIG. 6 is a flow chart of an example process for determining potential matches for ride sharing.

FIG. 6 is a flow chart of an example process 600 for determining potential matches for ride sharing. In some implementations, one or more process blocks of FIG. 6 may be performed by a device (e.g., suggestion system 115 (e.g., using processor 520, memory 530, storage component 540, input component 550, output component 560, communication interface 570, and/or the like)). In some implementations, one or more process blocks of FIG. 6 may be performed by another device or a group of devices separate from or including the device, such as vehicle devices 105 and/or the like.

As shown in FIG. 6, process 600 may include obtaining driving data identifying respective driving histories associated with vehicles (block 610). For example, the device may obtain driving data identifying respective driving histories associated with vehicles, as described above.

As further shown in FIG. 6, process 600 may include generating a shortest path tree based on data identifying a passenger starting point in the driving data (block 620). For example, the device may generate, in some aspects via a machine learning model, a shortest path tree based on data identifying a passenger starting point in the driving data, as described above. In some implementations, the machine learning model includes one or more of: a shortest path tree model, a Dijkstra's shortest path model, or an A* search model.

In some implementations, process 600 may include generating, via the machine learning model, a graph with a first layer and a second layer that correspond to the shortest path tree. For example, the device may generate, via the machine learning model, a graph with a first layer and a second layer that correspond to the shortest path tree, as described above.

In some implementations, process 600 may include adding, via the machine learning model, and based on the shortest path tree, paths from nodes in the first layer to corresponding nodes in the second layer. For example, the device may add via the machine learning model, and based on the shortest path tree, paths from nodes in the first layer to corresponding nodes in the second layer, as described above. Each of the paths may represent a cost for reaching each node in the second layer from a passenger starting point.

In some implementations, the device may receive data indicating that the passenger is to meet the driver at a particular location. The device may remove paths connecting nodes of the first layer to nodes of the second layer that are not associated with the particular location.

As further shown in FIG. 6, process 600 may include determining a first shortest path that starts from a driver starting point in the first layer, and ends at a passenger end point in the second layer (block 630). For example, the device may determine a first shortest path that starts from a driver starting point in the first layer, and ends at a passenger end point in the second layer, as described above.

As further shown in FIG. 6, process 600 may include determining a second shortest path that starts from the passenger end point and ends at a driver end point (block 640). For example, the device may determine a second shortest path that starts from the passenger end point and ends at a driver end point, as described above.

As further shown in FIG. 6, process 600 may include calculating a shared cost associated with the driver and the passenger sharing a ride, based on the first shortest path and the second shortest path (block 650). For example, the device may calculate a shared cost associated with the driver and the passenger sharing a ride, based on the first shortest path and the second shortest path, as described above.

As further shown in FIG. 6, process 600 may include calculating an unshared cost associated with the driver and the passenger not sharing the ride, based on the driving data (block 660). For example, the device may calculate an unshared cost associated with the driver and the passenger not sharing the ride, based on the driving data, as described above.

As further shown in FIG. 6, process 600 may include generating a recommendation to share or not share the ride based on a comparison of the shared cost and the unshared cost (block 670). For example, the device may generate a recommendation to share or not share the ride based on a comparison of the shared cost and the unshared cost, as described above.

In some implementations, the device may generate a recommendation to share the ride and/or generate a recommendation to have the driver pick up the passenger at a passenger starting point when the shared cost is less than the unshared cost.

In some implementations, the device may generate a recommendation to not share the ride when the shared cost is greater than or equal to the unshared cost.

In some implementations, the device may determine, via the machine learning model, a meeting point of the driver and the passenger as a node in which the first shortest path moves from the first layer to the second layer. The device may generate a recommendation to share the ride from the meeting point when the shared cost is less than the unshared cost.

In some implementations, the device may generate, via another machine learning model, assignments of pairs of drivers and passengers based on the driving data. The device may modify, via the other machine learning model, one or more assignments, of the assignments, to generate one or more modified assignments. The device may determine, via the machine learning model, costs associated with the one or more modified assignments. The device may determine final assignments of pairs of the drivers and the passengers based on lowest costs associated with the one or more modified assignments. The device may perform one or more actions based on the final assignments.

In some implementations, when modifying the one or more assignments, the device may select two pairs of the drivers and the passengers, assign a first driver of a first pair of the two pairs to a second passenger of a second pair of the two pairs, and assign a second driver of the second pair to a first passenger of the first pair and/or may swap roles within one of the pairs of the drivers and the passengers.

In some implementations, when determining the final assignments, the device may determine the final assignments of pairs of the drivers and the passengers after expiration of a predetermined time period or after a predetermined quantity of the assignments are modified.

In some implementations, when performing the one or more actions, the device may provide, to a device of one of the drivers, a suggestion to share a ride with one of the passengers; may provide, to a device of one of the passengers, a suggestion to share a ride with one of the drivers; may provide, to a vehicle device of one of the drivers, directions for a suggested ride share with one of the passengers; may provide, to a device of one of the passengers, instructions for sharing a ride with one of the drivers; may provide, to devices of the drivers and the passengers, information identifying cost savings associated with the final assignments; and/or may retrain the machine learning model or the other machine learning model based on the final assignments.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
    obtaining, by a device, driving data identifying respective driving histories associated with vehicles;
    generating, by the device via a machine learning model, a shortest path tree representing a starting location of the driving data;
    generating, by the device and via the machine learning model, a graph with at least a first layer and a second layer that correspond to the shortest path tree,
        wherein the shortest path tree is determined using a shortest path algorithm to compute a single path connecting at least the first layer to the second layer, and
        wherein a quantity of layers included in the graph corresponds to a quantity of passengers and drivers determining whether to share a ride;
    determining, by the device and based on the shortest path tree, a first shortest path that starts from a driver starting point in the first layer and ends at a passenger end point in the second layer;
    determining, by the device and based on the shortest path tree, a second shortest path that starts from the passenger end point in the second layer and ends at a driver end point in the second layer;
    calculating, by the device, a shared cost associated with a driver and a passenger sharing a ride, based on the first shortest path and the second shortest path;
    calculating, by the device, an unshared cost associated with the driver and the passenger not sharing the ride, based on the driving data;
    generating, by the device, a recommendation to share or not share the ride based on a comparison of the shared cost and the unshared cost;
    providing, by the device, the recommendation to the machine learning model; and
    retraining the machine learning model based on the recommendation.

2. The method of claim 1, further comprising:
    generating, via the machine learning model, the graph with the first layer and the second layer that correspond to the shortest path tree; and
    adding, via the machine learning model, and based on the shortest path tree, paths from nodes in the first layer to corresponding nodes in the second layer,
        wherein the first shortest path and the second shortest path are determined based on the paths.

3. The method of claim 2, further comprising:
    determining, via the machine learning model, a meeting point of the driver and the passenger as a node in which the first shortest path moves from the first layer to the second layer; and
    generating a recommendation to share the ride from the meeting point when the shared cost is less than the unshared cost.

4. The method of claim 2, wherein the first shortest path starts from a driver starting node corresponding to the driver starting point in the first layer, and ends at a passenger end node corresponding to the passenger end point in the second layer, and
    wherein the second shortest path starts from the passenger end node and ends at a driver end node corresponding to the driver end point in the second layer.

5. The method of claim 1, wherein each of the paths represents a cost for reaching each node in a second layer from a passenger starting point.

6. The method of claim 1, wherein generating the recommendation to share or not share the ride comprises:
    generating a recommendation to have the driver pick up the passenger at a passenger starting point when the shared cost is less than the unshared cost.

7. The method of claim 1, wherein generating the recommendation to share or not share the ride comprises:
    generating a recommendation to not share the ride when the shared cost is greater than or equal to the unshared cost.

8. A device, comprising:
    one or more processors configured to:
        receive, from vehicle devices of vehicles, driving data identifying respective driving histories associated with the vehicles;
        generate, via a machine learning model, a shortest path tree based on data identifying a passenger starting point in the driving data;
        generate, via the machine learning model, a graph with at least a first layer and a second layer that correspond to the shortest path tree,
            wherein the shortest path tree is determined using a shortest path algorithm to compute a single path connecting at least the first layer to the second layer, and
            wherein a quantity of layers included in the graph corresponds to a quantity of passengers and drivers determining whether to share a ride;
        add, via the machine learning model, and based on the shortest path tree, paths from nodes in the first layer to corresponding nodes in the second layer;
        identify, via the machine learning model, and from the paths, a first shortest path that starts from a driver starting node corresponding to a driver starting point in the first layer, and ends at a passenger end node corresponding to a passenger end point in the second layer;
        identify, via the machine learning model, and from the paths, a second shortest path that starts from the passenger end node, corresponding to the passenger end point in the second layer, and ends at a driver end node corresponding to a driver end point in the second layer;
        calculate, via the machine learning model, a shared cost associated with a driver and a passenger sharing a ride, based on the first shortest path and the second shortest path;
        calculate, via the machine learning model, an unshared cost associated with the driver and the passenger not sharing the ride, based on the driving data;
        generate a recommendation to share or not share the ride based on a comparison of the shared cost and the unshared cost;
        provide the recommendation to devices associated with the driver and the passenger;
        provide the recommendation to the machine learning model; and
        retrain the machine learning model based on the recommendation.

9. The device of claim 8, wherein the one or more processors are further configured to:
    receive data indicating that the passenger is to meet the driver at a particular location; and
    remove paths, connecting nodes of the first layer to nodes of the second layer, that are not associated with the particular location.

10. The device of claim 8, wherein the one or more processors are further configured to:
- generate, via another machine learning model, assignments of pairs of drivers and passengers based on the driving data;
- modify, via the other machine learning model, one or more assignments, of the assignments, to generate one or more modified assignments;
- determine, via the machine learning model, costs associated with the one or more modified assignments;
- determine final assignments of pairs of the drivers and the passengers based on lowest costs associated with the one or more modified assignments; and
- perform one or more actions based on the final assignments.

11. The device of claim 10, wherein the one or more processors, when performing the one or more actions, are configured to one or more of:
- provide, to a device of one of the drivers, a suggestion to share a ride with one of the passengers;
- provide, to a device of one of the passengers, a suggestion to share a ride with one of the drivers; or
- provide, to a vehicle device of one of the drivers, directions for a suggested ride share with one of the passengers.

12. The device of claim 10, wherein the one or more processors, when performing the one or more actions, are configured to one or more of:
- provide, to a device of one of the passengers, instructions for sharing a ride with one of the drivers; or
- provide, to devices of the drivers and the passengers, information identifying cost savings associated with the final assignments.

13. The device of claim 10, wherein the one or more processors, when modifying, via the other machine learning model, the one or more assignments, are configured to one of:
- select two pairs of the drivers and the passengers, assign a first driver of a first pair of the two pairs to a second passenger of a second pair of the two pairs, and assign a second driver of the second pair to a first passenger of the first pair; or
- swap roles within one of the pairs of the drivers and the passengers.

14. The device of claim 10, wherein the one or more processors, when determining the final assignments of pairs of the drivers and the passengers, are configured to:
- determine the final assignments of pairs of the drivers and the passengers after expiration of a predetermined time period or after a predetermined quantity of the assignments are modified.

15. A non-transitory computer-readable medium storing instructions, the instructions comprising:
- one or more instructions that, when executed by one or more processors, cause the one or more processors to:
  - receive, from vehicle devices of vehicles, driving data identifying respective driving histories associated with the vehicles;
  - generate, via a machine learning model, a shortest path tree based on data identifying a passenger starting point in the driving data;
  - generate, via the machine learning model, a graph with at least a first layer and a second layer that correspond to the shortest path tree,
    wherein the shortest path tree is determined using a shortest path algorithm used to compute a single path connecting at least the first layer to the second layer, and
    wherein a quantity of layers included in the graph corresponds to a quantity of passengers and drivers determining whether to share a ride;
  - add, via the machine learning model, and based on the shortest path tree, paths from nodes in the first layer to corresponding nodes in the second layer;
  - identify, via the machine learning model, and from the paths, a first shortest path on the second layer that starts from a driver starting node corresponding to a driver starting point in the first layer, and ends at a passenger end node corresponding to a passenger end point in the second layer;
  - identify, via the machine learning model, and from the paths, a second shortest path that starts from the passenger end node, corresponding to a passenger end point in the second layer, and ends at a driver end node corresponding to a driver end point in the second layer;
  - calculate, via the machine learning model, a shared cost associated with the driver and the passenger sharing a ride, based on the first shortest path and the second shortest path;
  - calculate, via the machine learning model, an unshared cost associated with the driver and the passenger not sharing the ride, based on the driving data;
  - selectively:
    - generate a recommendation to share the ride when the shared cost is less than the unshared cost, or
    - generate a recommendation to not share the ride when the shared cost is greater than or equal to the unshared cost;
  - provide the recommendation to the machine learning model; and
  - retrain the machine learning model based on the recommendation.

16. The non-transitory computer-readable medium of claim 15, wherein the one or more instructions, when executed by the one or more processors, further cause the one or more processors to:
- determine, via the machine learning model, a meeting point of the driver and the passenger as a node in which the first shortest path moves from the first layer to the second layer; and
- generate a recommendation to share the ride from the meeting point when the shared cost is less than the unshared cost.

17. The non-transitory computer-readable medium of claim 15, wherein each of the paths represents a cost for reaching each node in the second layer from a passenger starting point.

18. The non-transitory computer-readable medium of claim 15, wherein the one or more instructions, when executed by the one or more processors, further cause the one or more processors to:
- generate a recommendation to have the driver pick up the passenger at a passenger starting point when the shared cost is less than the unshared cost.

19. The non-transitory computer-readable medium of claim 15, wherein the one or more instructions, when executed by the one or more processors, further cause the one or more processors to:
- receive data indicating that the passenger wishes to meet at a particular location; and remove paths, connecting nodes of the first layer to nodes of the second layer, that are not associated with the particular location.

20. The non-transitory computer-readable medium of claim 15, wherein the one or more instructions, when executed by the one or more processors, further cause the one or more processors to:
generate, via another machine learning model, assignments of pairs of drivers and passengers based on the driving data;
modify, via the other machine learning model, one or more assignments, of the assignments, to generate one or more modified assignments;
determine, via the machine learning model, costs associated with the one or more modified assignments;
determine final assignments of pairs of the drivers and the passengers based on lowest costs associated with the one or more modified assignments; and
perform one or more actions based on the final assignments.

* * * * *